US010690295B2

(12) United States Patent
King

(10) Patent No.: US 10,690,295 B2
(45) Date of Patent: Jun. 23, 2020

(54) APPARATUS WITH COMPUTER INTERFACE MODULE FOR USE IN VEHICLES

(71) Applicant: Global Navigation Sciences, Inc., Hayden, ID (US)

(72) Inventor: Matthew King, Hayden, ID (US)

(73) Assignee: Global Navigation Sciences, Inc., Hayden, ID (US)

( * ) Notice: Subject to any disclaimer, the term of this patent is extended or adjusted under 35 U.S.C. 154(b) by 0 days.

(21) Appl. No.: 16/034,007

(22) Filed: Jul. 12, 2018

(65) Prior Publication Data

US 2019/0017658 A1 Jan. 17, 2019

Related U.S. Application Data

(60) Provisional application No. 62/531,457, filed on Jul. 12, 2017.

(51) Int. Cl.
*F21K 9/238* (2016.01)
*B60R 11/02* (2006.01)
(Continued)

(52) U.S. Cl.
CPC .............. *F21K 9/238* (2016.08); *B60Q 3/00* (2013.01); *B60Q 3/59* (2017.02); *B60Q 3/85* (2017.02); *B60R 11/02* (2013.01); *B64D 47/02* (2013.01); *F21K 9/237* (2016.08); *H02J 7/00* (2013.01); *B64D 2221/00* (2013.01)

(58) Field of Classification Search
CPC ..... F21K 9/20–238; F21K 9/237; B60Q 3/59; B60Q 3/85; B60Q 3/00; B60R 11/02; B64D 47/02; B64D 2221/00; H02J 7/00; F21V 14/003; F21V 17/02; F21V 19/02; F21V 21/00; F21V 21/096; F21V 21/0832; F21V 17/105; F21V 17/108; F21V 17/16; F21V 23/00; F21V 23/007; F21V 23/008; F21V 23/06; F21V 23/003; F21W 2106/00; F21W 2102/00
See application file for complete search history.

(56) References Cited

U.S. PATENT DOCUMENTS 9,644,828 B1 * 5/2017 May ........................ F21V 7/00
2009/0002977 A1 * 1/2009 Arnold, III ............. F21L 4/085
362/183

(Continued)

*Primary Examiner* — Bao Q Truong
(74) *Attorney, Agent, or Firm* — Lee & Hayes, P.C.

(57) ABSTRACT

An apparatus with a computer interface module (CIM) is described herein. The assembly may be coupled to, and may receive power from, wiring of a vehicle. The vehicle wiring may include wiring dedicated to the apparatus or wiring that was previously dedicated to another component of the vehicle. The assembly may be installed via a mounting base including the CIM configured with a receptacle for coupling to a cable. The CIM may be configured to provide power to an electronic device, such as via the cable. Additionally, the CIM may be configured to communicate with one or more electronic devices via a wired and/or wireless connection. The assembly may include a lamp unit with an efficient light source. The lamp unit may include a lamp configured to adjust between white, red, and/or green lights. The assembly may include a clamping system configured to securely house a mobile computing device.

20 Claims, 15 Drawing Sheets

(51) Int. Cl.
*F21K 9/237* (2016.01)
*B60Q 3/00* (2017.01)
*H02J 7/00* (2006.01)
*B60Q 3/59* (2017.01)
*B64D 47/02* (2006.01)
*B60Q 3/85* (2017.01)

(56) References Cited

U.S. PATENT DOCUMENTS

| | | | | |
|---|---|---|---|---|
| 2009/0026959 A1* | 1/2009 | Lin | B60Q 7/00 315/77 |
| 2009/0174571 A1* | 7/2009 | McKenna | G01C 21/26 340/901 |
| 2010/0120361 A1* | 5/2010 | Rappaport | H04B 1/719 455/18 |
| 2010/0284199 A1* | 11/2010 | Carnevali | B60R 11/00 362/523 |
| 2011/0121654 A1* | 5/2011 | Recker | H02J 9/065 307/66 |
| 2012/0195031 A1* | 8/2012 | Li | F21L 4/085 362/183 |
| 2013/0203277 A1* | 8/2013 | Gaubert | H01R 13/5219 439/271 |
| 2014/0056028 A1* | 2/2014 | Nichol | G02B 6/0065 362/611 |
| 2014/0073161 A1* | 3/2014 | Winningham | H01R 13/521 439/271 |
| 2014/0099811 A1* | 4/2014 | Chiu | H01R 13/5219 439/275 |
| 2014/0328076 A1* | 11/2014 | Firman, II | H01R 13/6675 362/511 |
| 2015/0251605 A1* | 9/2015 | Uken | H04N 5/2257 248/467 |
| 2015/0316837 A1* | 11/2015 | Maltese | F16M 13/04 294/139 |
| 2016/0352100 A1* | 12/2016 | Cheng | H02J 1/06 |
| 2017/0080854 A1* | 3/2017 | Medina Luna | B60Q 3/51 |
| 2017/0114965 A1* | 4/2017 | Maglica | F21L 4/08 |
| 2018/0013934 A1* | 1/2018 | Germe | H04N 5/2252 |
| 2018/0062407 A1* | 3/2018 | Li | B60R 16/02 |
| 2018/0118076 A1* | 5/2018 | Shin | H04L 63/0853 |
| 2018/0287287 A1* | 10/2018 | Buttolo | H02J 7/0045 |
| 2018/0319326 A1* | 11/2018 | Daylong | B60Q 1/444 |

* cited by examiner

US 10,690,295 B2

APPARATUS WITH COMPUTER INTERFACE MODULE FOR USE IN VEHICLES

RELATED APPLICATIONS

This application claims priority to U.S. Provisional Patent Application No. 62/531,457, filed on Jul. 12, 2017, the entire contents of which are incorporated herein by reference.

BACKGROUND

Vehicle operators often require the use of a computing device to assist in various operating activities, such as navigation. The computing devices may require an interface for power and/or data transfer. However, a retrofit of a cockpit, cabin, or other personal space to include a computer interface can be both time intensive and extremely expensive. Additionally, interior utility lighting is important for the night-time operation of many vehicles, such as aircraft, motor vehicles, vessels, or the like. Many older vehicles are outfitted with inefficient lighting that can be potentially dangerous to vehicle operators. A further retrofit of the cockpit, cabin or other personal space may additionally increase the amount of time and money required for the upgrade.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5A is a side view of the lamp unit being removed from the magnetic coupling. FIG. 5B is a side view of a tilting motion of the lamp unit while coupled to the magnetic coupling. FIG. 5C is a side view of a rotational motion of the lamp unit while coupled to the magnetic coupling.

DETAILED DESCRIPTION

Figure 1:
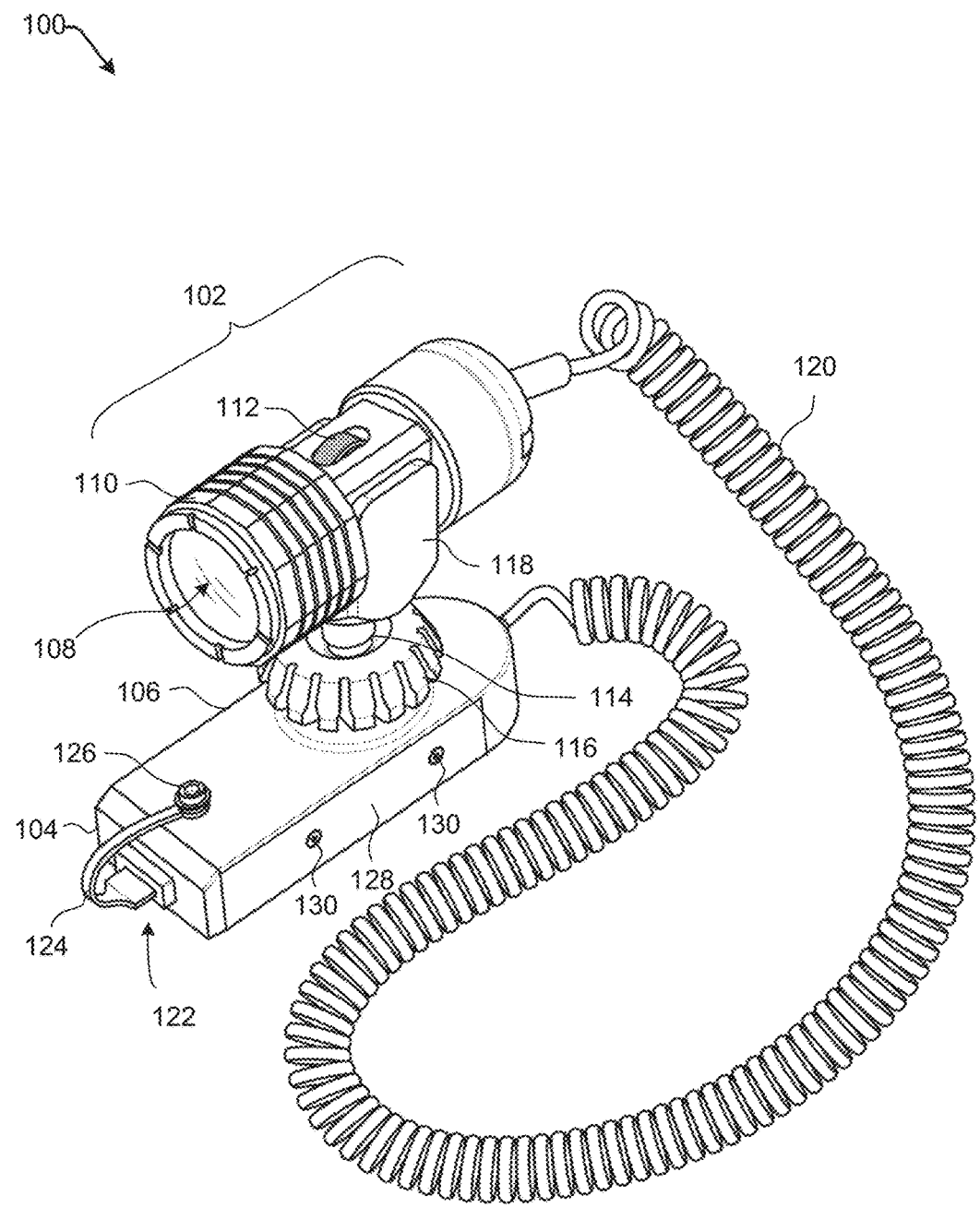
FIG. 1 is a perspective view of an example assembly with a computer interface module and a lamp.

This disclosure is generally directed to an assembly for mounting in a vehicle with a computer interface module (CIM). The CIM may include a receptacle for receiving data transfer cables, power adapters, and/or a printed circuit board. In some examples, the CIM may be removable and replaceable, in whole or in part, from a mounting base. In such examples, the assembly may be configured to receive different data transfer cables (e.g., USB, HDMI, etc.) and/or different power adapters (e.g., 24V, 35 W, 65 W, etc.). Additionally, the replaceable feature may provide the benefit of being upgradeable, such as, for example, with technological advancement.

In various examples, the mounting base may be coupled to the vehicle at an existing mounting location, such as a location of a traditional lamp assembly. In some examples, the mounting base may be coupled to the vehicle at different location. The mounting base may be coupled to the vehicle mechanically and/or electrically. The mechanical coupling may include nuts, bolts, screws, hook and loop connectors, cam lock fasteners, turn-lock fastener (e.g., DZUS® fasteners), self-ejecting fasteners, or any other mechanical coupling capable of securing the mounting base to the vehicle. In various examples, the mounting base of the assembly may be mechanically connected to a mounting plate, which is coupled to the aircraft via a mechanical coupling. In such examples, the mechanical coupling connecting the mounting plate to the aircraft may be a same (e.g., both screw couplings) or a different (e.g., one screw couplings, one turn-lock fasteners) mechanical coupling as that connecting the mounting base to the mounting plate. The electrical coupling may include electrical wiring to provide power to the assembly (e.g., the CIM and/or a lamp). The electrical wiring may include AC and/or DC power. In some examples, the electrical wiring may include existing wiring on the vehicle, such as that used to provide AC and/or DC power to a vehicle component (e.g., a lamp).

In various examples, the mounting base may include a cradle for coupling a computing device thereto. In some examples, the connector may include one or more arms. The arm(s) may be metal (e.g., aluminum, titanium, steel, etc.), plastic, composite, or a combination thereof. In some examples, the arm(s) may be adjustable to hold computing devices of different sizes. In some examples, the arm(s) may be movable from an extended position in which a computing device may be inserted, to a retracted position, in which the computing device may be securely held in place. The arms may include a friction surface. In some examples, the friction surface may be manufactured into the arm(s), such as, for example, by knurling the arm(s). Additionally or alternatively, the friction surface may include a rubber, soft plastic, and/or other material mounted on the outer surface of the arm(s). For example, the arms of the connector may be coated with rubber to securely hold the computing device in the connector.

In various examples, the assembly may include a lamp. In such examples, the lamp may include an energy efficient light source, such as a light emitting diode (LED), to provide illumination. The assembly, with the energy efficient lamp and the CIM, may improve upon existing light sources by requiring merely a fraction of the energy required by the traditional vehicle lighting systems (e.g., Grimes halogen lights). The lamp may be configured to adjust between white, red, and/or green light. The lamp may be additionally configured with a dimmer switch (e.g., dimmer rheostat, dimmer slide, etc.), to adjust a brightness of the light. In some examples, the color adjustment and dimming functionality may be actuated by a single control, such as a single action wheel control. In other examples, the color adjustment and dimming functionality may be actuated using separate controllers.

The lamp may be coupled to the mounting base. In some examples, the lamp may be detachably coupled to the mounting base. In various examples, the mounting base may be configured to receive power from an external source, and in turn provide power to the lamp and/or the CIM.

Although the assembly with the CIM is primarily described herein in the context of an aircraft cockpit, this is merely for illustrative purposes, and the assembly may be used in many mobile or non-mobile contexts, such as in motor vehicles, vessels, in an office, in a home, etc. The description of the assembly in the aircraft cockpit is not intended to be limiting.

The apparatuses and techniques described herein may be implemented in a number of ways. Example implementations are provided below with reference to the following figures.

FIG. 1 is a perspective view of an example assembly 100 with a lamp unit 102 and a computer interface module (CIM) 104 coupled to a mounting base 106. As will be discussed in detail below, the lamp unit 102, the CIM 104, and the mounting base 106 may include one or more components. The one or more components may include one or more metals (e.g., aluminum, steel, titanium, alloy, copper, etc.), plastics (e.g., acrylic, silicone, polyurethane, etc.), rubbers, composites (e.g., fiberglass, carbon fiber, etc.), epoxies, microchips, and/or other materials used in lamps, clamps, computing devices, computer interfaces, or the like.

In various examples, the lamp unit 102 may include a lamp 108. The lamp 108 may be a light source to provide illumination, such as, for example, in a flight compartment of an aircraft (e.g., cockpit). In some examples, the lamp 108 may include an energy efficient light source, such as, for example, light emitting diodes (LEDs) or compact fluorescent lights. In various examples, the lamp 108 may include light sources of different colors, and may be configured to switch between the different colors. For example, the lamp 108 may include a red LED and a white LED, and may be configured to switch between the red LED and the white LED. For another example, the lamp 108 may include a green compact fluorescent bulb and a white compact fluorescent bulb, and may be configured to switch between the green bulb and the white bulb.

In some examples, the lamp 108 may be configured with one or more lenses. In some examples, the one or more lenses may include a clear lens and one or more colored lenses (e.g., red, green, blue, etc.). In at least one example, the lamp 108 may be configured with a red lens and a clear lens, such as for white light. In another example, the lamp 108 may be configured with a green lens and a clear lens.

In some examples, the lamp 108 may be configured with an adjustable aperture. In such examples, the lamp 108 may be adjusted between a focused ray of light and a flood light. In some examples, the lamp 108 may be configured with a dimmer (e.g., switch, rheostat, etc.). In such examples, an intensity of light from the lamp 108 may be adjusted. In various examples, one or more features (e.g., emitting bulb(s), lens, aperture, dimmer, etc.) of the lamp 108 may be adjusted via a collar 110. For example, the collar 110 may be adjustable fore and aft to adjust an aperture, and may be rotated to adjust an intensity of light (e.g., dim or bright). In another example, the collar 110 may be adjustable fore and aft to adjust an intensity of light and may be rotated to adjust an aperture. Additionally or alternatively, one or more features of the lamp 108 may be adjusted using one or more controllers 112. In the illustrative example, the controller(s) 112 is depicted as a control wheel (e.g., mouse wheel). In other examples, and as will be described below with respect to FIG. 2, the controller(s) 112 may include a tactile button type controller. In yet other examples, the controller(s) 112 may include a rheostat knob or other controller configured to adjust a feature of the lamp 108. For example, a controller 112 may rotate to a first position in which the lamp emits a red light to a second position in which the lamp emits a white light. For another example, the controller 112 may rotate forward to increase an intensity of light and aft to decrease an intensity of light.

In various examples, the lamp unit 102 may be coupled to the mounting base 106 via one or more couplings 114. The coupling(s) 114 may include any type of mechanical coupling (e.g., a magnetic coupling, a ball and socket joint (e.g., gimbal mount), a snap-fit coupling, a hook and loop coupling, and/or a combination thereof). The coupling(s) 114 may secure the lamp unit in place or the coupling(s) 114 may allow the lamp unit 102 to move about one or more axes. In some examples, the assembly 100 may include a single coupling 114, such as for example, a ball and socket coupling or a magnetic coupling. In such examples, the coupling may permit the lamp unit 102 to move about two axes (e.g., tilt about a first axis and spin about a second axis). For example, the coupling 114 may allow the lamp unit 102 to spin about the coupling 114 and tilt vertically (i.e., raise a beam of light from a horizontal orientation to a vertical orientation.). In at least one example, the lamp unit 102 may be configured to spin about 360 degrees about the coupling 114 and tilt from a mounted axis (i.e., axis of the surface to which the assembly 100 is mounted, such as, for example horizontal or vertical axis) to about 90 degrees above the mounted axis.

In the illustrative example, the coupling 114 includes a ball and socket coupling. As described above, the ball and socket coupling 114 may permit rotation about a vertical axis and tilting about a horizontal axis. In some examples, the coupling 114 may additionally include a compression nut 116. In such examples, the compression nut 116 may be configured to adjust an amount of force required to move the lamp unit 102 about the vertical and/or horizontal axis. The compression nut 116 may be tightened to increase an amount of force required to move the lamp unit 102, and may be loosened to decrease an amount of force required to move the lamp unit 102. For example, while operating in a high-G environment at night, such as while flying air-to-air combat maneuvering, an operator of an aircraft may need to occasionally reference information on a kneeboard. The operator may tilt and/or spin the lamp unit 102 in order to illuminate the kneeboard with the lamp 108. Once in place, the operator may tighten down the compression nut 116 to increase the force required to move the lamp unit 102 in the coupling 114. Thus, while the operator increases G-forces exerted on the aircraft, the lamp unit 102 may remain in place, with the lamp 108 continually illuminating the kneeboard.

As illustrated in FIG. 1, the coupling 114 may be coupled to a connector 118 configured to house the lamp unit 102. In some examples, the lamp unit 102 may be securely held in the connector 118, and may be unable to be removed. In some examples, the lamp unit 102 may be removable from the connector 118. In the illustrative example, the connector 118 is a yoke-type connector configured with a snap-fit coupling to detachably secure the lamp unit 102 in place. In other examples, as will be described below with respect to FIG. 4, the connector 118 may include a magnetic connector configured with a ferrous metal coupler to detachably secure the lamp unit 102 in place.

In various examples, the lamp unit 102 may be battery powered, such as to provide increased mobility and utility of the lamp 108. In such examples, a battery of the lamp unit 102 may be charged when the lamp unit 102 is secured in the connector 118. In the illustrative example, the lamp unit 102 is configured to receive power from the mounting base 106 via a power cord 120. In some examples, the power cord 120 may include an extendable cord, to allow for longer range of movement of the lamp unit from the mounting base 106. In some examples, the power cord 120 may include a retractable cord configured to extend and retract into the mounting base 106, such as, for example, with an inertial reel.

In various examples, the mounting base 106 may be configured to house the CIM 104. In some examples, the CIM 104 may include a receptacle 122. The receptacle 122 may include a port for receiving a cable or other connector. The cable may include data transfer cables and/or a power adapter. The receptacle 122 may be configured to receive one or more of various types of cable connectors, such as USB, mini USB, micro USB, HDMI, coaxial direct current, or the like. In some examples, the CIM 104 may be configured to provide power (e.g., 2.5 W, 5 W, 29 W, 35 W, 65 W, etc.) to a connected computing device, based at least in part on the type of connector the receptacle 122 is configured to receive. In various examples, the CIM may be removable and replaceable, in whole or in part, from the mounting base 106. In such examples, the assembly 100 may be configured to receive different cables. For example, a first CIM 104 may include a receptacle to receive a USB connector may be replaced by a second CIM 104 with a receptacle to receive a micro USB connector.

As will be discussed in greater detail below with regard to at least FIG. 10, the CIM 104 may include one or more printed circuit boards. In some examples, the printed circuit board(s) may be specific to the particular receptacle of the CIM 104. In such examples, the first printed circuit board (or set thereof) may be removed with the first receptacle 122, such as, for example, a USB connector, and a second printed circuit board (or set thereof) may be inserted along with a second receptacle 122, such as, for example, a micro-USB connector.

In various examples, the printed circuit board(s) may be configured to assist in data transfer via a wired connection. In such examples, the data may transfer to and from a connected computing device via the receptacle 122 and attached cable. The data transfer may be from the connected computing device to a computing device of the vehicle. For example, the connected computing device may transfer navigation data to an aircraft flight management system, or vice versa. Additionally or alternatively, the printed circuit board(s) may be configured to assist in data transfer via a wireless connection. In such examples, the wireless connection may include near field communication (NFC), Bluetooth, Wi-Fi, or other types of wireless connections. In some examples, the wireless connection may be a secure (e.g., closed and/or limited access) wireless connection.

In some examples, the printed circuit board(s) may comprise part of a computing system of the assembly 100. In such examples, the computing system may be configured to perform various computing functions, such as calculations, or the like. In some examples, the computing system of the assembly 100 may be configured to work in conjunction with a connected computing device to perform desired operations in a flight compartment. For example, the connected electronic device may send data to the computing system of the assembly 100 for complex calculations. For another example, the computing system may constantly request weather information from a remote weather source, and may push weather updates to the connected computing device based on a determination that an aspect of the weather (e.g., ceilings, winds, turbulence, icing, etc.) has changed a threshold amount.

In various examples, one or more of the printed circuit board(s) and/or the computing system of the assembly 100 may be configured to receive and decrypt encrypted wireless messages. In such examples, the one or more of the printed circuit board(s) and/or the computing system may send the decrypted message to the connected computing device, such as via a cable connected via the receptacle 122.

In some examples, the mounting base 106 may include a receptacle plug 124 configured to be inserted into the receptacle 122 when the receptacle 122 is otherwise not in use (e.g., computing device not connected to the receptacle 122 via a cable). In such examples, the receptacle plug 124 may protect the receptacle from debris, dust, or other foreign objects which may damage the receptacle and/or the CIM. In various examples, the receptacle plug 124 may be coupled to the mounting base 106 via a coupler 126. In such examples, the receptacle plug 124 may be securely connected to the mounting base 106, to ensure it will not get lost when the CIM 104 is in use (e.g., when a computing device is connected to the receptacle via a cable).

The mounting base 106 of the assembly 100 may be configured to couple to a substantially flat surface. As will be discussed in greater detail below with regard to at least FIGS. 3 and 10, the mounting base 106 may be configured to couple to a mounting plate 128. The mounting plate 128 may be coupled to the substantially flat surface, such as via a first mechanical coupling (e.g., bolts, screws, rivets, hook and loop connectors, cam lock fasteners, turn-lock fastener (e.g., DZUS® fasteners), self-ejecting fasteners (e.g., spring release fasteners). For example, a bottom side of the mounting plate 128 may be coupled to the substantially flat surface via one or more screws. In various examples, a side wall of the mounting plate 128 may couple to the mounting base 106 via a second mechanical coupling. In the illustrative example, the mounting plate 128 is coupled to the mounting base 106 via two mechanical couplers 130.

Figure 2:
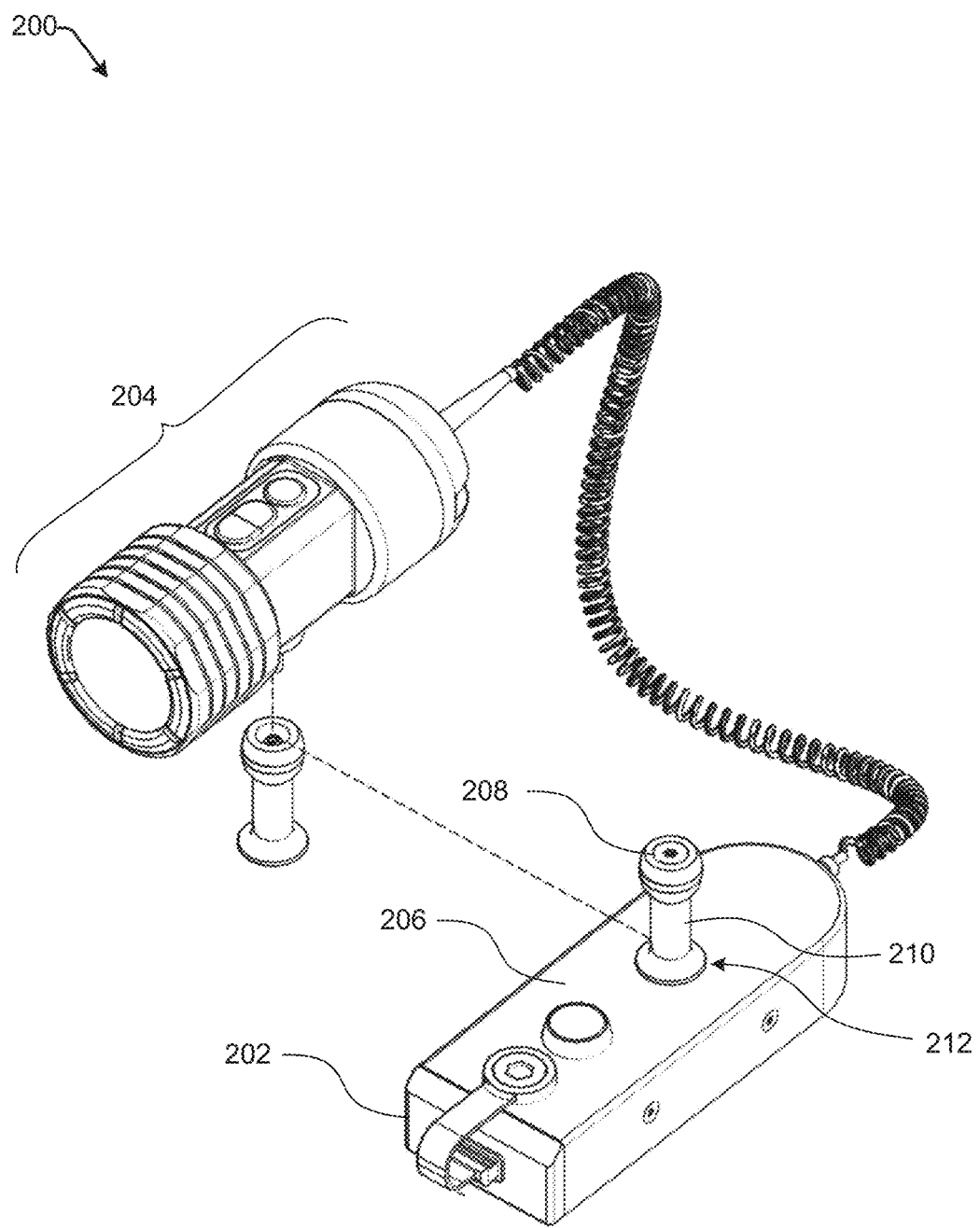
FIG. 2 is a perspective view of an example assembly with a computer interface module and a detachable lamp coupled to the assembly via an example magnetic coupling.

FIG. 2 is a perspective view of an example assembly 200, such as assembly 100, with a computer interface module (CIM) 202, such as CIM 204 and a detachable lamp unit 204, such as lamp unit 102, coupled to a mounting base 206, such as mounting base 106 via an example magnetic coupling 208.

The magnetic coupling 208 may include a docking post 210, which is coupled to the mounting base 206. In some examples, the docking post 210 may be secured to the mounting base 206, and thus may not be allowed to move. In such examples, movement of the lamp unit 204, such as about a horizontal and/or vertical axis, may be permitted by the magnetic coupling 208. In some examples, the docking post 210 may be configured to spin about an attachment point 212. In such examples, the docking post 210 may permit motion about a vertical axis (e.g., axis of the docking post 210), allowing the lamp unit 204 attached thereto to spin up to 360 degrees.

As will be discussed in greater detail below with regard to FIG. 4, the magnetic coupling may include internal components. The internal components may include an internal magnet and a friction bushing in the docking post 210, and a ferrous metal coupler mounted in the lamp unit 204. The internal magnet and the ferrous metal coupler may be polarized to attract one another. The size and/or strength of the internal magnet and/or the ferrous metal coupler (e.g., magnetization) may be determined based on an amount of force required to separate the lamp unit 204 from the docking post 210. For example, a strong magnetization between the internal magnet and the ferrous metal coupler may require a relatively large amount of force (e.g., 10 lbs. of force, 15 lbs. of force, etc.) to remove the lamp unit 204 from the docking post, whereas a weaker magnetization may require a relatively small amount of force (e.g., 3 lbs. of force, 5 lbs. of force, 8 lbs. of force, etc.). In various examples, the size and/or strength of the internal magnet and/or the ferrous metal coupler may be configured to permit an operator to remove the lamp unit 204 with one hand.

Figure 3:
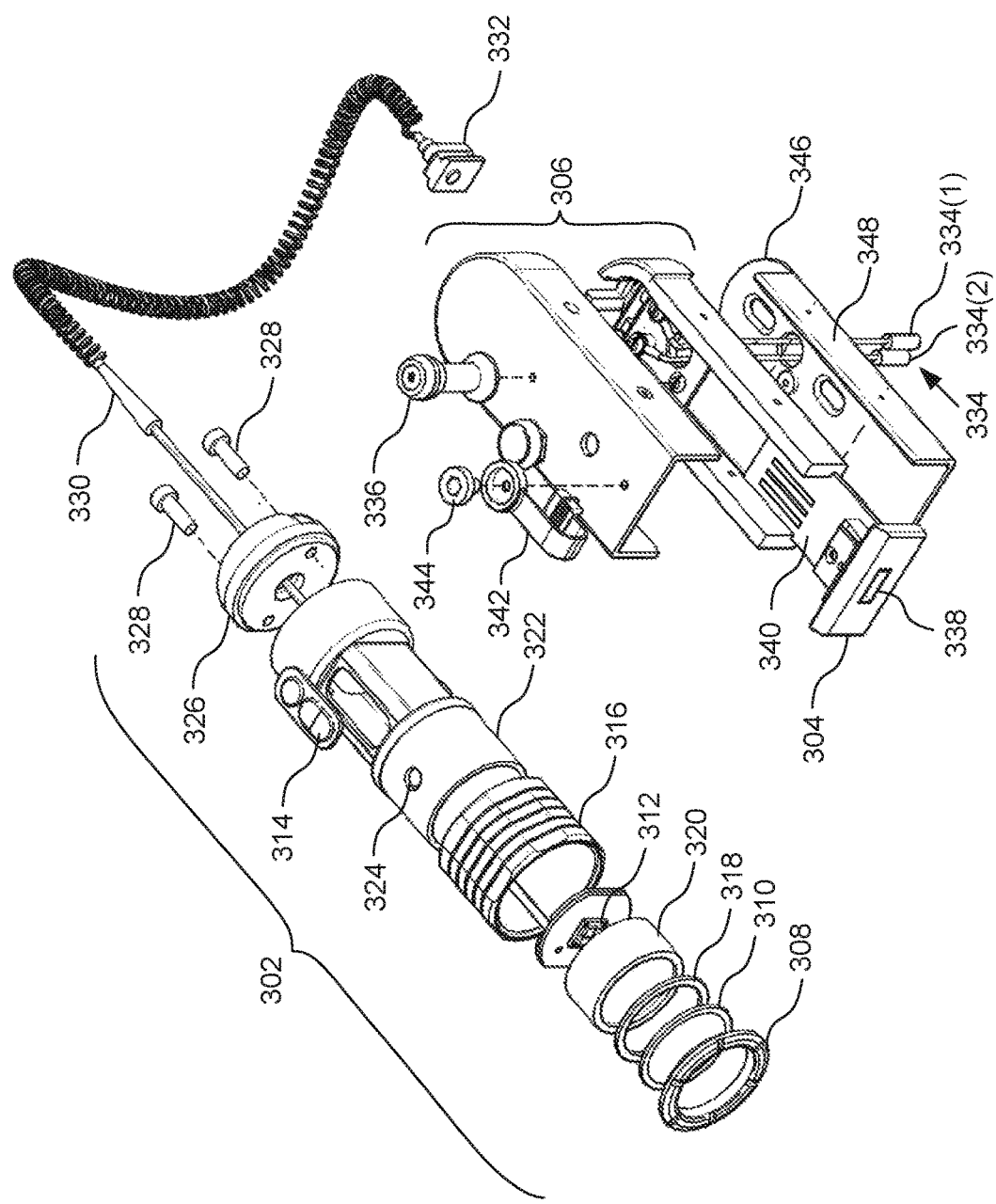
FIG. 3 is an exploded view of components of the example assembly as described with respect to FIG. 2.

FIG. 3 is an exploded view of components of the example assembly 300 as described with respect to FIG. 2. The assembly 300, such as assembly 200, includes a lamp unit 302, such as lamp unit 204, a computer interface module (CIM) 304, such as CIM 202, and a mounting base 306, such as mounting base 206.

As illustrated in FIG. 3, the lamp unit 302 may include a bezel 308. The bezel 308 may be configured to protect a lens 310 of the lamp unit 302. In various examples, the bezel 308 may be configured to spin about an axis of the lamp unit 302. In some examples, the bezel 308 may be configured to adjust the aperture of a light emanating from the lamp unit 302. As discussed above, the lamp unit 302 may be configured with one or more lenses 310 of different colors. In the illustrative example, the lamp unit 302 includes a single lens 310. In some examples, the lens 310 may be a substantially clear (e.g., not colored) lens.

In various examples, the lamp unit 302 may include a light emitting diode (LED) array module 312. The LED array module 312 may be configured with multiple LED lights. In various examples, the LED lights of the LED array module 312 may include LED lights of different colors (e.g., white, red, green, blue, etc.). In some examples, the lamp unit 302 may be configured to switch between emanating two or more colors. For example, the lamp unit 302 may be configured to switch between illuminating white LED lights to illuminating red LED lights. An operator of the lamp unit 302 may adjust a lamp control 314, a collar 316, and/or other controller, to adjust from illuminating the white LED lights to illuminating the red LED lights, such as, for night use of the lamp unit 302.

In various examples, the lens 310 and/or the LED array module 312 may be protected by a lens seal 318. The lens seal 318 may comprise silicone, rubber, neoprene, cork, gum, urethane, or any other material configured to create a substantially impregnable seal. Additionally, the LED array module 312 may be inserted into, and/or protected by a reflector 320. The reflector 320 may reflect the light illuminated by the LED array module 312, and may be configured to amplify the light.

As discussed above, the collar 316 of the lamp unit 302 may be configured to adjust one or more features of the emitted light. The one or more features may include a color of the light, an aperture of the light, and/or an intensity of the light (e.g., bright/dim). In some examples, to adjust the feature(s), the collar 316 may be twisted about an axis of the lamp unit 302. In various examples, the collar 316 may be coupled to a housing 322 of the lamp unit, such as via a snap-fit connector, or other coupling. As illustrated in FIG. 3, a protrusion on an interior surface of the collar 316 may couple to an opening 324 in the housing 322. The coupling between the protrusion of the collar 316 and the opening 324 in the housing 322 may permit the collar 316 and the housing 322 to rotate as a single unit, and may preclude the collar 316 from slipping off the lamp unit 302.

In various examples, the collar 316 may include a friction component on the surface, to assist an operator in gripping the collar 316. The friction component may include a material with a coefficient of friction to assist in gripping the collar, such as, for example, a rubber or silicone material. In some examples, the friction component may also include a manufactured pattern on the surface of the collar 316 to assist in gripping. In some examples, the collar 316 may include a knurled, pitted, and/or ridged, surface. As illustrated in FIG. 3, the collar 316 may include a pitted, rubber surface as a friction component, to assist an operator in rotating the collar 316 about an axis of the lamp unit 302 to adjust the one or more features of the emitted light.

Additionally or alternatively, the feature(s) of the emitted light may be adjusted via the controller 314. In some examples, such as that depicted in FIG. 1, the controller 314 may include a control wheel. In the illustrative example, the controller 314 includes a tactile button type of controller. In such an example, the controller 314 may substantially prevent any liquid or other foreign object from breaching the surface of, and potentially causing damage to, the lamp unit 302.

In various examples, the lamp unit 302 may include an end cap 326 configured to couple to and cover a back end of the lamp unit 302. In the illustrative example, the end cap 326 may couple to the lamp unit 302 via two bolt-type couplings 328. In other examples, the end cap 326 may be coupled to the lamp unit 302 via greater or fewer bolt-type couplings 328. In yet other examples, the end cap 326 may be coupled to the lamp unit 302 via different types of mechanical couplings, such as, for example, snap-fit couplings, screw-type couplings, or the like.

As illustrated, the end cap 326 may be configured to house a first end of a power cord 330. The lamp unit 302 may be powered, in whole or in part, by the power cord 330. The second end of the power cord 330 may be coupled to and may receive power from the mounting base 306. In the illustrative example, the second end of the power cord 330 may be detachably coupled to the mounting base 306, such as via a slide coupler 332. The mounting base 306 may be configured to transfer power from vehicle wiring 334 (e.g., a first wire 334(1) and a second wire 334(2)) to the slide coupler 332 or other connection of the power cord 330 to the mounting base 306. The vehicle wiring 334 may include existing wiring in a vehicle, such as an aircraft or car. In other words, the first wire 334(1) and/or the second wire 334(2) may include wiring that was previously used to provide power to a different component, such as an old lighting system in the vehicle. The use of existing wiring simplifies the modification of the vehicle to include the assembly 300, by decreasing an amount of time needed to install, by decreasing an amount of time necessary to receive authorization from regulatory authorities (e.g., Federal Aviation Administration), and by decreasing an amount of money required to perform the installation.

In various examples, the lamp unit 302 may be detachably coupled to the mounting base 306 via a coupling 336. In the illustrative example, the coupling includes a magnetic coupling, such as magnetic coupling 208. In other examples, the lamp unit 302 may be detachably coupled to the mounting base 306 via a different type of mechanical coupling 336, such as a snap-fit connector, a quick-release connector, a spring-type connector, or the like. In such examples, the mechanical coupling 336 may be configured to be released using a single hand of the vehicle operator. In yet other examples, the lamp unit 302 may be non-detachably coupled to the mounting base 306 via a mechanical coupling 336, such as a screw-type coupling, a bolt-type coupling, or other mechanical coupling 336 that is configured to securely hold the lamp in place. In various examples, the mechanical coupling 336 may permit movement of the lamp unit about one or more axes. For example, the mechanical coupling 336 may permit the lamp unit 302 to tilt about a horizontal axis and to spin about a vertical axis, to adjust an area illuminated by the lamp unit.

In various examples, the mounting base 306 may be configured to house the CIM 304. In some examples, the CIM 304 may include a receptacle 338. The receptacle 338 may include a port for receiving a cable and/or other connector. The cable may include a data transfer cable and/or a power adapter. The receptacle 338 may be configured to receive one or more of various types of cable connectors, such as USB, mini USB, micro USB, HDMI, coaxial direct current, or the like. In some examples, the CIM 304 may be configured to provide power (e.g., 2.5 W, 5 W, 29 W, 35 W, 65 W, etc.) to a connected computing device, based at least in part on the type of connector the receptacle 304 is configured to receive. In such examples, the vehicle wiring 334 may provide power to the CIM 304. In various examples, the CIM 304 may be removable and replaceable, in whole or in part, from the mounting base 306. In such examples, the assembly 300 may be configured to receive different cables. For example, a first CIM 304 may include a receptacle to receive a USB connector may be replaced by a second CIM 304 with a receptacle to receive a micro USB connector.

The CIM 304 may include one or more printed circuit boards 340. In some examples, the printed circuit board(s) 340 may be specific to the particular receptacle of the CIM 304. In such examples, the first printed circuit board 340 (or set thereof) may be removed with the first receptacle 338, such as, for example, a USB connector, and a second printed circuit board 340 (or set thereof) may be inserted along with a second receptacle 338, such as, for example, a micro USB connector.

In various examples, the printed circuit board(s) 340 may be configured to assist in data transfer via a wired connection. In such examples, the data may transfer to and from a connected computing device via the receptacle 338 and attached cable. The data transfer may be from the connected computing device to a computing device of the vehicle. For example, the connected computing device may transfer navigation data to an aircraft flight management system, or vice versa. Additionally or alternatively, the printed circuit board(s) 340 may be configured to assist in data transfer via a wireless connection. In such examples, the wireless connection may include near field communication (NFC), Bluetooth, Wi-Fi, or other types of wireless connections. In some examples, the wireless connection may be a secure (e.g., closed and/or limited access) wireless connection.

In some examples, the printed circuit board(s) 340 may comprise part of a computing system of the assembly 300. In such examples, the computing system may be configured to perform various computing functions, such as calculations, or the like. In some examples, the computing system of the assembly 300 may be configured to work in conjunction with a connected computing device to perform desired operations in a flight compartment. For example, the connected computing device may send data to the computing system of the assembly 300 for complex calculations. For another example, the computing system may constantly request weather information from a remote weather source, and may push weather updates to the connected computing device and/or a computing system of the vehicle based on a determination that an aspect of the weather (e.g., ceilings, winds, turbulence, icing, etc.) has changed a threshold amount.

In various examples, one or more of the printed circuit board(s) 340 and/or the computing system of the assembly 300 may be configured to receive and decrypt encrypted wireless messages, such as from a computing system of the vehicle. In such examples, the one or more of the printed circuit board(s) 340 and/or the computing system of the assembly 300 may send the decrypted message to the connected computing device, such as via a cable connected via the receptacle 122.

In some examples, the mounting base 306 may include a receptacle plug 342 configured to be inserted into the receptacle 338 when the receptacle 338 is otherwise not in use (e.g., computing device not connected to the receptacle 338 via a cable). In such examples, the receptacle plug 342 may protect the receptacle from debris, dust, or other foreign objects which may damage the receptacle and/or the CIM 304. In various examples, the receptacle plug 342 may be coupled to the mounting base 306 via a coupler 344. In such examples, the receptacle plug 342 may be securely connected to the mounting base 306, to ensure it will not get lost when the CIM 304 is in use (e.g., when a computing device is connected to the receptacle 338 via a cable).

The mounting base 306 of the assembly 300 may be configured to couple to a substantially flat surface. In various examples, the mounting base 306 may be configured to couple to a mounting plate 346. The mounting plate 346 may be coupled to the substantially flat surface, such as via a first mechanical coupling (e.g., bolts, screws, rivets, hook and loop connectors, cam lock fasteners, turn-lock fastener (e.g., DZUS® fasteners), and/or self-ejecting fasteners (e.g., spring release fasteners). For example, a bottom side of the mounting plate 346 may be coupled to the substantially flat surface via one or more screws. In various examples, a side wall 348 of the mounting plate 346 may couple to the mounting base 306 via a second mechanical coupling.

Figure 4:
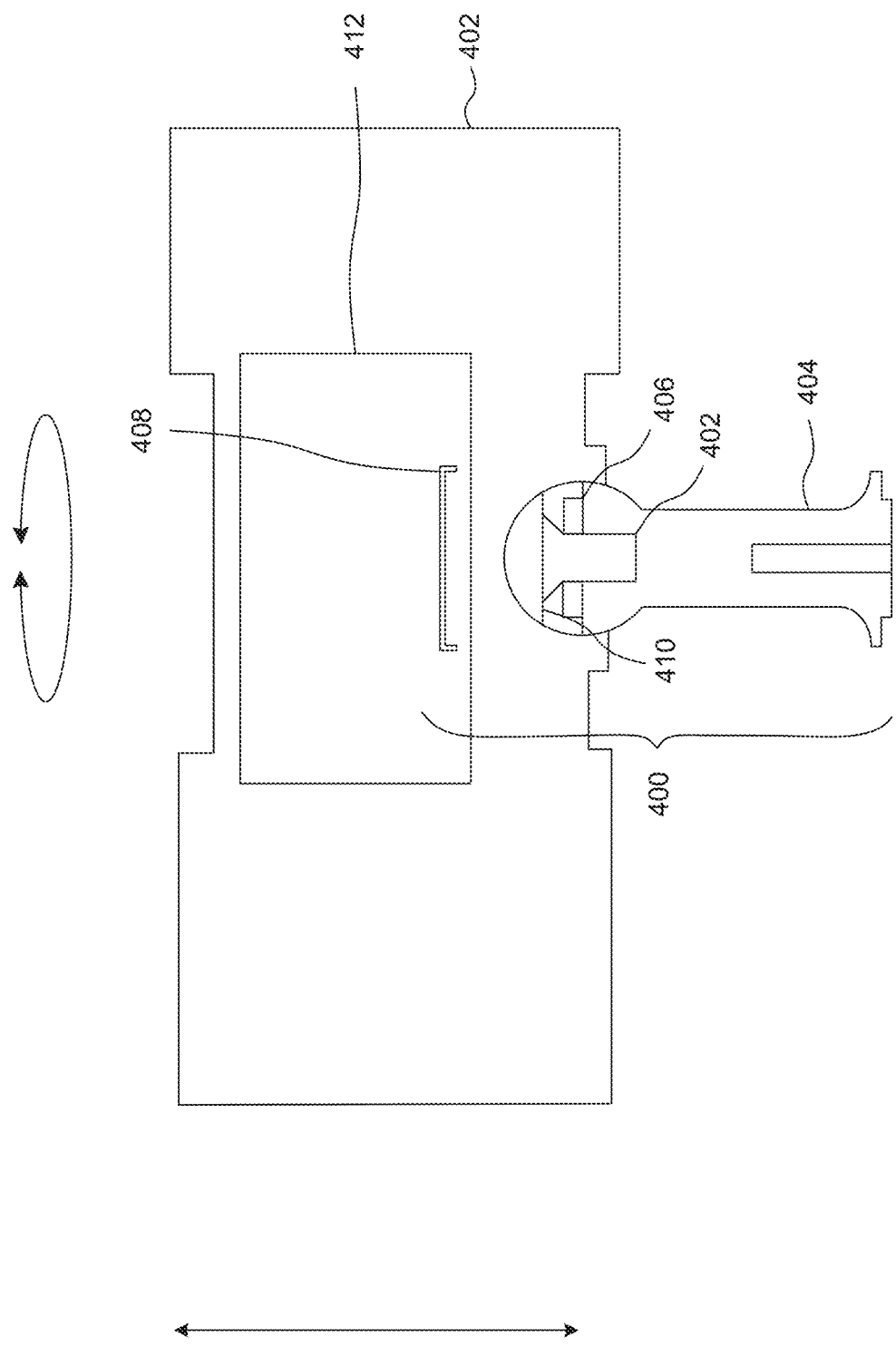
FIG. 4 is an exploded view of components of the example magnetic coupling as described with respect to FIGS. 2 and 3.

FIG. 4 is a detailed view of components of the example magnetic coupling 400 as described with respect to FIGS. 2 and 3. As described above, a lamp unit 402, such as lamp unit 302, may be coupled to an assembly, such as assembly 100, 200, and/or 300, via a magnetic coupling 400.

The magnetic coupling 400 may include a docking post 404. In various examples, the docking post 404 may be secured to a mounting base of the assembly. The docking post 404 may include an internal magnet 406. In various examples, the internal magnet 406 may be configured to be attracted to a ferrous metal coupler 408 located in a housing 412, such as housing 322, of the lamp unit 402. In such examples, the internal magnet 406 and the ferrous metal coupler 408 may be polarized to attract one another. The size and/or strength of the attraction between (e.g., magnetization) the internal magnet 406 and/or the ferrous metal coupler 408 may be based on a pre-determined amount of force (e.g., 4 lbs. of force, 9 lbs. of force, 13 lbs. of force, etc.) required to separate the lamp unit 402 from the docking post 404. For example, a strong magnetization between the internal magnet 406 and the ferrous metal coupler 408 may require a relatively large amount of force (e.g., 8 lbs. of force, 15 lbs. of force, etc.) to remove the lamp unit 204 from the docking post, whereas a lesser magnetization may require a relatively small amount of force (e.g., 3 lbs. of force, 5 lbs. of force, 8 lbs. of force, etc. In various examples, the size and/or strength of the internal magnet 406 and/or the ferrous metal coupler 408 may be configured to permit an operator to remove the lamp unit 204 with one hand.

In various examples, the size and/or strength of the internal magnet 406 and the ferrous metal coupler 408 may be determined based on an environment in which the assembly is to be used. For example, an assembly mounted in a commercial aircraft is unlikely to encounter heavy G-forces that would inadvertently cause the lamp unit 402 to become detached from the docking post 404. In such an example, the size and/or strength of the internal magnet 406 and the ferrous metal coupler 408 may be less than an aircraft that is configured to operate in a high-G environment, such as a strike fighter.

In various examples, the magnetic coupling 400 may include a friction bushing 410. In such examples, the friction bushing 410 may include a friction component configured to assist the lamp unit 402 in maintaining a pre-set position. As discussed above, the magnetic coupling 400 may permit movement of the lamp unit 402 about one or more axes. For example, the lamp unit 402 may be configured to tilt about a horizontal axis and/or spin about a vertical axis. The friction bushing 410 may assist in maintaining the tilted and/or spun orientation of the lamp unit 402. The friction bushing 410 may include a rubber, a plastic, a composite, or other frictional material. In some examples, the friction bushing 410 may include a surface coating to increase a coefficient of friction between the docking post 402 and the lamp unit 404. In such examples, the surface coating may include a rubber, a plastic, composite, polytetrafluoroethylene, plasma, or any other coating with a high coefficient of friction. Additionally, the friction bushing 410 may include a knurled, pitted, ridged, or otherwise treated surface for increasing friction between the docking post 404 and the lamp unit 402. In various examples, the material, surface coating, and/or surface treatment may be determined based on an environment in which the assembly is to be used. For example, in the high G environment described above with regard to a strike fighter, a friction bushing 410 with a high coefficient of friction will be required to maintain a position of the lamp unit 402 with respect to the docking post 402.

Figure 5C:
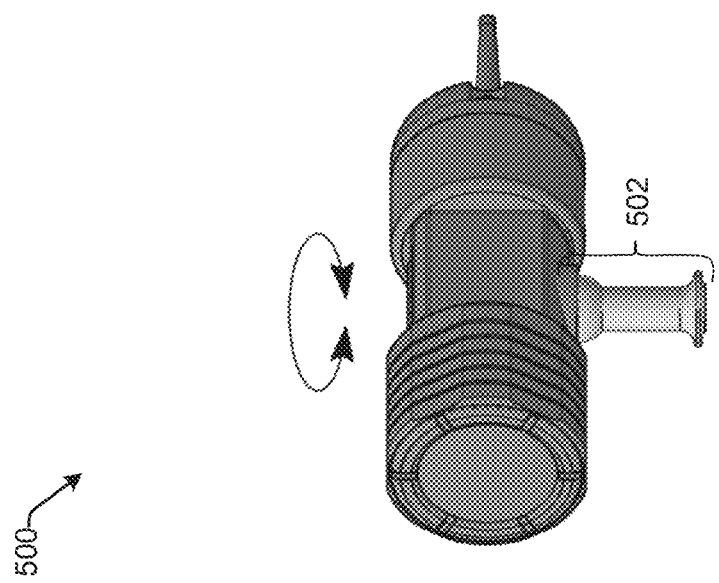
FIGS. 5A-5C are illustrations of the freedom of movement of a lamp unit coupled to an assembly via a magnetic coupling, such as that described with respect to FIGS. 2-4.
Figure 5B:
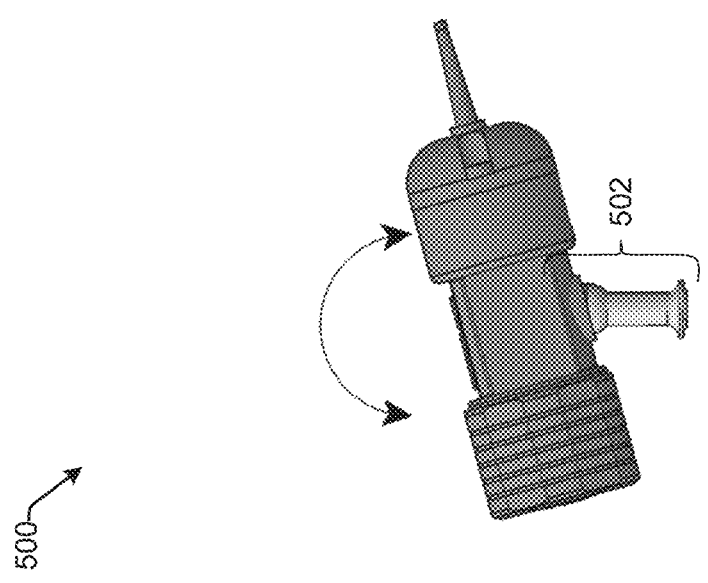
Figure 5A:
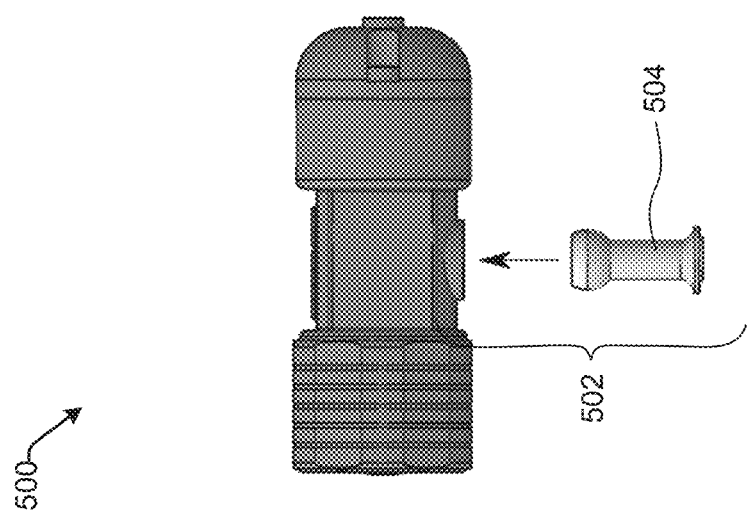

FIGS. 5A-5C are illustrations of the freedom of movement of a lamp unit 500 coupled to an assembly via a magnetic coupling 502, such as that described with respect to FIGS. 2-4. FIG. 5A is a side view of the lamp unit 500 being removed from a docking post 504 of the magnetic coupling 502. As discussed above, the magnetic coupling 502 may include an internal magnet mounted in the docking post 504 and a ferrous metal coupler mounted in the lamp unit 500. The internal magnet and the ferrous metal coupler may be polarized to attract one another. The size and/or strength of the attraction between (e.g., magnetization) the internal magnet and/or the ferrous metal coupler may be based on a pre-determined amount of force (e.g., 4 lbs. of force, 9 lbs. of force, 13 lbs. of force, etc.) required to separate the lamp unit 500 from the docking post 504. For example, a strong magnetization between the internal magnet and the ferrous metal coupler may require a relatively large amount of force (e.g., 10 lbs. of force, 15 lbs. of force, etc.) to remove the lamp unit 204 from the docking post, whereas a lesser magnetization may require a relatively small amount of force (e.g., 3 lbs. of force, 4 lbs. of force, 7 lbs. of force, etc.) In various examples, the size and/or strength of the internal magnet and/or the ferrous metal coupler may be configured to permit an operator to remove the lamp unit 500 with one hand.

FIG. 5B is a side view of a tilting motion of the lamp unit 500 while coupled to the magnetic coupling 502. As discussed above, the magnetic coupling 502 may permit movement of the lamp unit 500 about one or more axes. As illustrated in 5B, the lamp unit 500 may be configured to tilt about a horizontal axis. In some examples, the lamp unit 500 may be able to tilt up to 75 degrees above and/or below the horizontal axis.

As discussed above, the magnetic coupling 502 may include a friction bushing mounted in the lamp unit 500. In such examples, the friction bushing may include a friction component configured to assist the lamp unit 500 in maintaining a pre-set position, such as the tilt depicted in FIG. 5B. The friction bushing may include a rubber, a plastic, a composite, or other frictional material. In some examples, the friction bushing may include a surface coating to increase a coefficient of friction between the docking post 504 and the lamp unit 500. In such examples, the surface coating may include a rubber, a plastic, composite, polytetrafluoroethylene, plasma, or any other coating with a high coefficient of friction. Additionally, the friction bushing may include a knurled, pitted, ridged, or otherwise treated surface for increasing friction between the docking post 504 and the lamp unit 500. In various examples, the material, surface coating, and/or surface treatment may be determined based on an environment in which the assembly is to be used. For example, in the high G environment described above with regard to a strike fighter, a friction bushing with a high coefficient of friction will be required to maintain a position of the lamp unit 500.

FIG. 5C is a side view of a rotational motion of the lamp unit 500 while coupled to the magnetic coupling 502. In the illustrative example, the lamp unit 500 may be configured to spin about a vertical axis. In various examples, the lamp unit 500 may be configured to spin 360 degrees about the vertical axis, in either direction. As discussed above with regard to FIG. 5B, the friction bushing mounted in the lamp unit may assist the lamp unit 500 in maintaining a pre-set position about the vertical axis.

Figure 6:
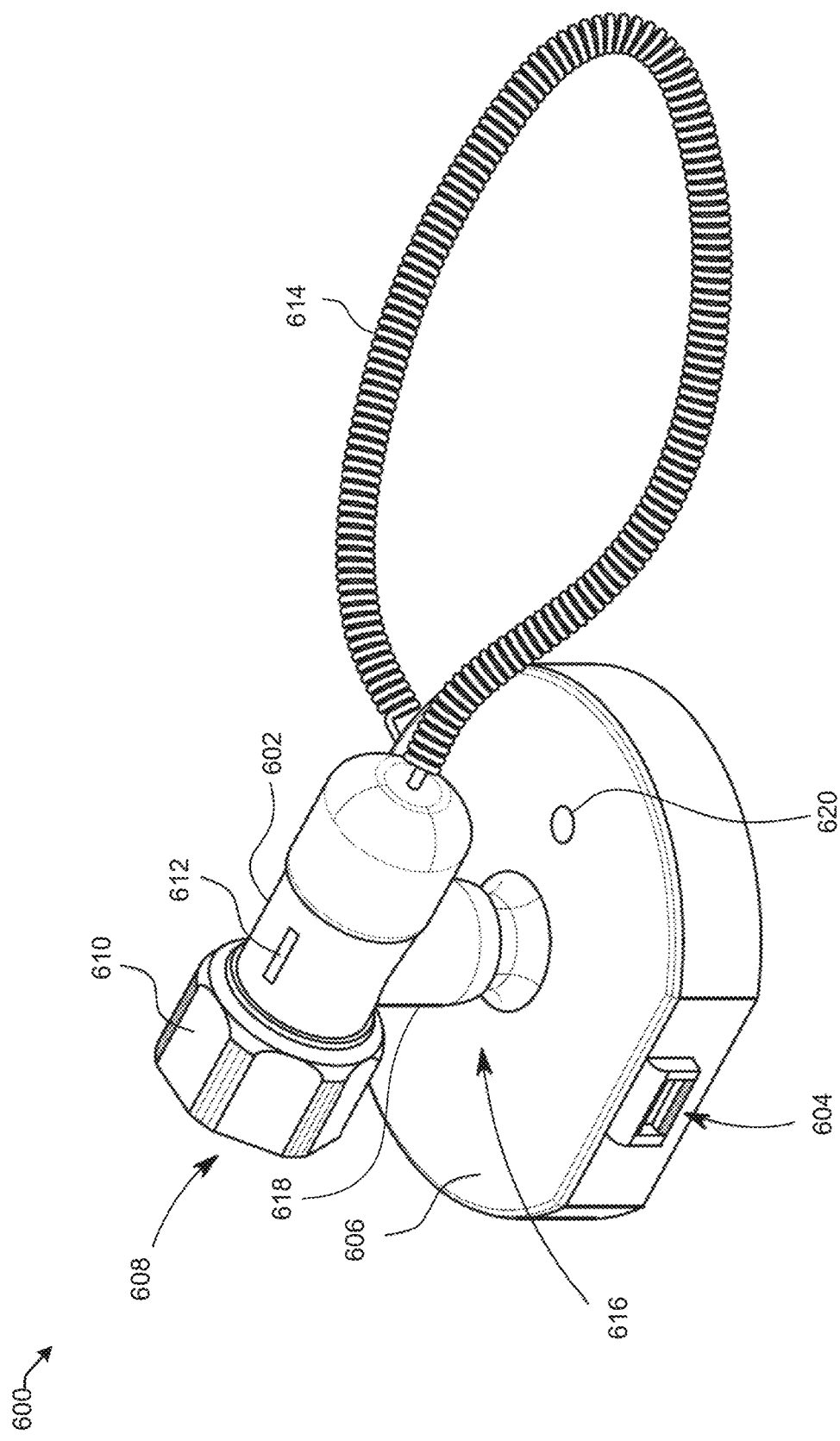
FIG. 6 is a rear perspective view of an example assembly with a lamp and a computer interface module.

FIG. 6 is a rear perspective view of an example assembly 600. The assembly 600 may include a lamp unit 602 and a computer interface module (CIM) 604 coupled to a mounting base 606.

In various examples, the lamp unit 602 may include a lamp 608. The lamp 608 may be a light source to provide illumination. In some examples, the lamp 608 may include an energy efficient light source, such as a light emitting diode (LED). In other examples, the light source may include a compact fluorescent bulb, a fluorescent bulb, an incandescent bulb, or any other type of light source. In some examples, the lamp 608 may emit light of one or more colors. In such examples, the lamp 608 may include different colored LEDs and/or bulbs, and may be configured to switch between the different colors. For example, the lamp 608 may include a red LED, a green LED, and a white LED. In at least one example, the lamp 608 may be configured to switch between two colors, such as, for example, between white and green or between white and red.

In some examples, the lamp 608 may be configured with one or more lenses. In some examples, the one or more lenses may include different colors (e.g., red, green, etc.). In at least one example, the lamp 608 may be configured with a red lens and a clear lens, such as for white light. In another example, the lamp 608 may be configured with a green lens and a clear lens. In some examples, the lamp 608 may be configured with an adjustable aperture. In such examples, the lamp 608 may be adjusted between a focused ray of light and a flood light. In some examples, the lamp 608 may be configured with a dimmer (e.g., switch, rheostat, etc.). In such examples, an intensity of light from the lamp 608 may be adjusted.

In various examples, one or more features (e.g., emitting bulb(s), lens, aperture, dimmer, etc.) of the lamp 608 may be adjusted via a collar 610. For example, the collar 610 may be adjustable fore and aft to adjust an aperture, and may be rotated to adjust an intensity of light. Additionally or alternatively, one or more features may be adjusted using one or more controllers 612. In various examples, the controller(s) may include a sealed tactile lamp button control, a scroll wheel (e.g., a mouse wheel), a rheostats, or other controller configured to adjust a feature of the lamp 608. For example, an controller 612 may rotate from a first position in which the lamp emits a white light to a second position in which the lamp emits a red light, and to a third position in which the lamp emits a green light. For another example, the controller 612 may rotate forward to decrease an intensity of light, and aft to increase an intensity of the light. For yet another example, the controller 612 may adjust intensity of the light, and the collar 610 may be configured to adjust a lens of the lamp 608.

In some examples, the lamp unit 602 may be coupled to the mounting base 606 via one or more couplings 616. In some examples, the coupling(s) 616 may include any type of mechanical coupling (e.g., a magnetic coupling, a ball and socket joint, a snap-fit coupling, a hook and loop coupling, and/or a combination thereof). The coupling 616 may secure the lamp unit 602 in place or the coupling(s) 616 may allow the lamp unit 602 to move about one or more axes. In some examples, the assembly 600 may include a single coupling, such as for example, a ball and socket coupling. In such examples, the coupling may permit the lamp unit 602 to move about two axes (e.g., tilt about a first axis and spin about a second axis). For example, the coupling 616 may allow the lamp unit 602 to spin about the coupling(s) 616 and tilt vertically (i.e., raise a beam of light from a horizontal orientation to a vertical orientation.). In at least one example, the lamp unit 602 may be configured to spin about 360 degrees about the coupling 616 and tilt from a mounted axis (i.e., axis of the surface to which the assembly 600 is mounted, such as, for example horizontal or vertical axis) to about 90 degrees above the mounted axis.

In various examples, the assembly 600 may include a connection arm 618 configured to couple the lamp unit 602 to the mounting base 606. In some examples, the connection arm 618 may include two couplings 616. For example, a first coupling at a first end of the connection arm 618 may couple to the lamp unit 602 and a second coupling at a second end of the connection arm 618 may couple to the mounting base 606. The first coupling 616 may permit the lamp unit 602 to tilt about a first axis, and the second coupling 616 may permit the lamp unit 602 and connection arm to spin up to 360 degrees about a second axis.

In various examples, the lamp unit 602 may be detachably coupled to the mounting base 606 via the coupling 616. In some examples, the lamp unit 602 and/or the mounting base 606 may include a release 620. In such examples, the release 620 may be activated to permit the lamp unit 602 to detach from the mounting base 606. For example, the release 620 may be pressed, thereby releasing a magnetic and/or mechanical coupling. Once detached, the lamp unit 602 may be operated as a hand-held device and/or may be placed in an alternate mount for use. For example, the mounting base 606 may be mounted on a wall of a cockpit at a seat height. A user may detach the lamp unit 602 from the mounting base 606 and place the lamp unit 602 into a second mount located in an elevated position, such as above the user's head.

In some examples, the lamp unit 602 may be battery powered, such as to provide increased mobility and utility of the lamp 608. In such examples, a battery of the lamp unit 602 may be charged when the lamp unit 602 is docked in a docking station of the mounting base 606. In the illustrative example, the lamp unit 602 may be configured to receive power from the mounting base 606 via a power cord 614. In some examples, the power cord 614 may include an extendable cord, to allow a longer range of movement of the lamp unit 602 from the mounting base 606.

In various examples, the mounting base 606 may be configured to house the CIM 604. In some examples, the CIM 604 may include a receptacle for receiving a cable and/or a printed circuit board. The cable may include data transfer cables and/or a power adapter. The receptacle may be configured to receive one or more of various types of cable connectors, such as USB, mini USB, micro USB, HDMI, coaxial direct current, or the like. In some examples, the CIM 604 may be configured to provide power (e.g., 2.5 W, 5 W, 29 W, 35 W, 65 W, etc.) to a connected electrical device, based at least in part on the type of connector the receptacle is configured to receive.

As will be discussed in greater detail with regard to FIG. 7, the CIM 604 may be removable and replaceable, in whole or in part. In such examples, the assembly 600 may be configured to receive different cables. For example, a first CIM 604 may include a receptacle to receive a USB connector may be replaced by a second CIM 604 with a receptacle to receive a micro USB connector.

In various examples, the CIM 604 may include one or more printed circuit boards. In some examples, the printed circuit board(s) may be specific to the particular receptacle of the CIM 604. In such examples, the first printed circuit board (or set thereof) may be removed with the first receptacle, such as described above, and a second printed circuit board (or set thereof) may be inserted along with a second receptacle.

In various examples, the printed circuit board(s) may be configured to assist in data transfer via a wired connection. In such examples, the data may transfer to and from a connected computing device via the receptacle and attached cable. The data transfer may be from the connected computing device to a computing device of the vehicle. For example, the connected computing device may transfer navigation data to an aircraft flight management system, or vice versa. Additionally or alternatively, the printed circuit board(s) may be configured to assist in data transfer via a wireless connection. In such examples, the wireless connection may include near field communication (NFC), Bluetooth, Wi-Fi, or other types of wireless connections. In some examples, the wireless connection may be a secure (e.g., closed and/or limited access) wireless connection.

In some examples, the printed circuit board(s) may comprise part of a computing system of the assembly 600. In such examples, the computing system may be configured to perform various computing functions, such as calculations, or the like. In some examples, the computing system of the assembly 600 may be configured to work in conjunction with a connected computing device to perform desired operations in a cockpit. For example, the connected electronic device may send data to the computing system of the assembly 600 for complex calculations. For another example, the computing system may constantly request weather information from a remote weather source, and may push weather updates to the connected computing device based on a determination that an aspect of the weather (e.g., ceilings, winds, turbulence, icing, etc.) has changed a threshold amount.

In various examples, one or more of the printed circuit board(s) and/or the computing system of the assembly 600 may be configured to receive and decrypt encrypted wireless messages. In such examples, the one or more of the printed circuit board(s) and/or the computing system may send the decrypted message to the connected computing device, such as via a cable connected via the receptacle.

In some examples, the mounting base 606 may be configured to couple to a substantially flat surface. In such examples, the mounting base 606 may include mounting brackets on a bottom side (i.e., a side opposite the lamp unit 602). In various examples, the mounting base 606 may be configured to couple to a mounting plate, which is coupled to the vehicle. In such examples, the mounting plate may be mechanically coupled to the vehicle, such as via a first mechanical coupling. For examples, the mounting plate may be screwed into an interior, substantially flat surface of the vehicle. The mounting base 606 may then be coupled to the mounting plate, such as via a second mechanical coupling. The first and the second mechanical couplings may include a same and/or different mechanical coupling. In some examples, the mounting base 606 may also include wiring to power the lamp unit 602, the printed circuit board(s), and/or the computing system. The wiring may additionally power the computing device coupled to the assembly 600, such as via the CIM 604.

Figure 7:
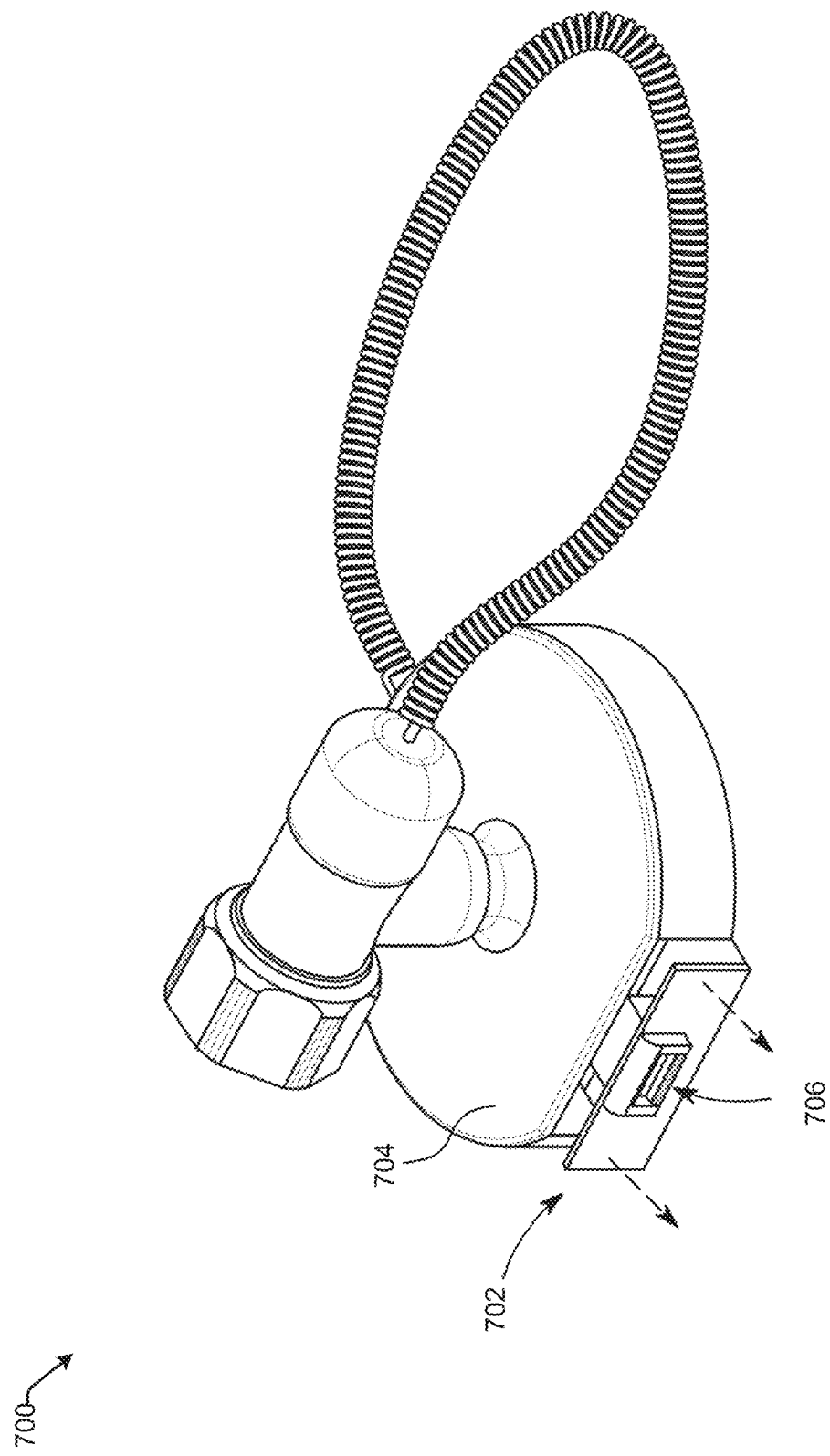
FIG. 7 is a rear perspective view of an example assembly with a removable computer interface module.

FIG. 7 is a rear perspective view of an example assembly 700, such as assembly 100, with a removable computer interface module (CIM) 702, such as CIM 104. As described above, a mounting base 704 of the assembly 700 may be configured to house the CIM 702. The CIM 702 may include a receptacle 706 for receiving a cable, one or more printed circuit boards, and/or a computing system. In the illustrative example, the receptacle 706 is configured to receive a USB connector. In other examples, the receptacle 706 may be configured to receive other types of cable connectors.

As illustrated in FIG. 7, the CIM 702 may be removable and replaceable, in whole or in part. In the illustrative example, the CIM 702 may be configured to slide out of the mounting base 704. After a first CIM 702 is removed from the mounting base 704, a second CIM 702 may be slid into place in the mounting base 704. In some examples, an entire CIM 702, including the receptacle 706, the printed circuit boards(s), and/or the computing system may be removed and replaced. In some examples, one or more of the receptacle 706, the printed circuit boards(s), and/or the computing system may be removed from the assembly 700 and replaced. For example, the CIM 702 may be removed from the mounting base 704, and a printed circuit board configured to receive and decrypt encrypted messages may be added to the CIM 702. The CIM 702 may be configured to slide back into place in the mounting base 704.

Figure 8:
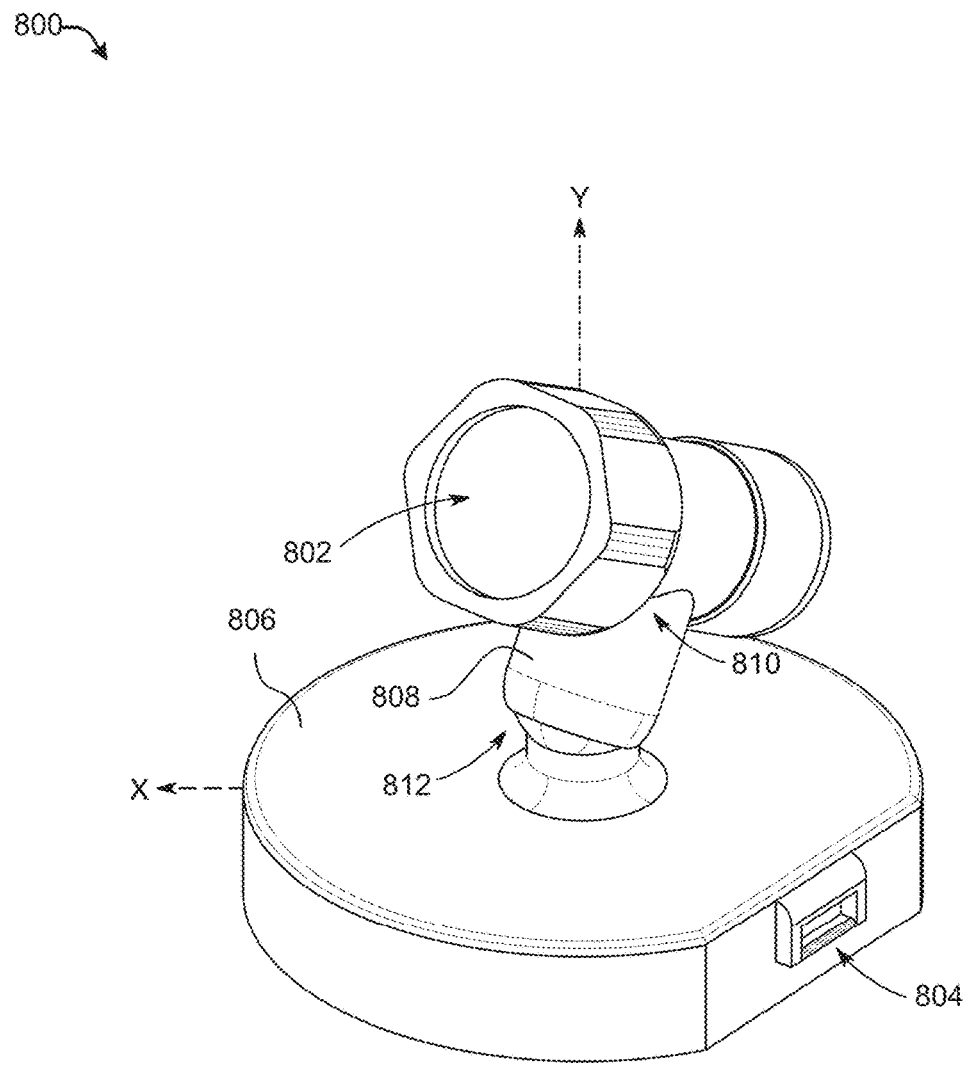
FIG. 8 is a front perspective view of an example assembly with a lamp and a computer interface module.

FIG. 8 is a front perspective view of an example assembly 800, such as assembly 100, with a lamp unit 802, such as lamp unit 102, a computer interface module (CIM) 804, such as CIM 104, and a mounting base 806, such as mounting base 106.

In the illustrative example, the lamp unit 802 may be coupled to the mounting base 806 via a connector 808. The connector 808 may include a first coupling 810 and a second coupling 812. As illustrated, the first coupling 810 includes a snap-fit coupling, and the second coupling 812 includes a ball and socket joint. In other examples, the first coupling 810 and/or the second coupling 812 may include other couplings, such as a hook and loop coupling, a sleeve coupling, a geared coupling, a magnetic coupling, or the like. In the illustrative example, the second coupling 812 is configured to allow the lamp unit 802 to rotate 360 degrees about a vertical axis Y, and to tilt vertically, such as about a horizontal axis X. In some examples, the lamp unit 802 may be configured to tilt up to 90 degrees from the horizontal axis X. In other examples, a first coupling 810 may allow for tilting, and the second coupling 812 may allow for rotation, or vice versa.

In various examples, the first coupling 810 and/or the second coupling 812 may be configured to release the lamp unit 802. For example, the first coupling 810 snap-fit coupling may release and allow the lamp unit 802 to be used as a hand-held lamp. For another example, the second coupling 812 may release and allow the lamp unit 802 to be used as a hand-held lamp, with the connector 808 acting as a handle. In some examples, the lamp unit 802 and/or the connector 808 may be detached from the mounting base 806 and coupled to another mount.

Figure 9:
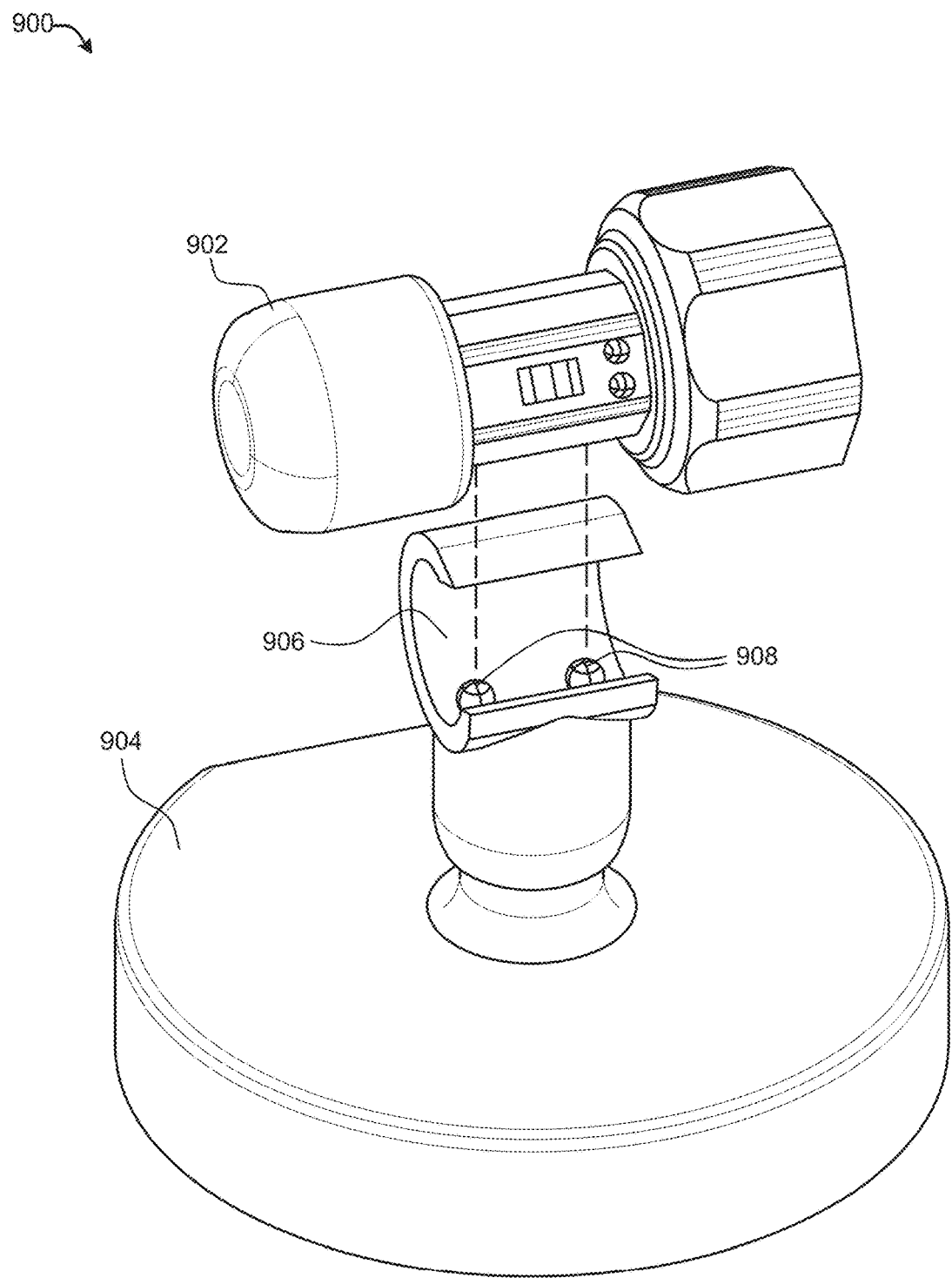
FIG. 9 is a side perspective view of an example assembly with a detachable lamp, coupled to the assembly via an example mechanical coupling.

FIG. 9 is a side perspective view of an example assembly 900, such as lamp assembly 800 with a detachable lamp unit 902, such as lamp unit 802. In various examples, the lamp unit 902 may be configured to couple to a mounting base 904, such as mounting base 806, via a coupling 906. In the illustrative example, the coupling 906 may include a snap-fit coupling. However, as described above and below, the coupling 906 may comprise any type of coupling.

In some examples, the lamp unit 902 may additionally be coupled to the mounting base 904 via a cord. In such examples, the lamp unit 902 may receive power from the mounting base 904 via the cord. In the illustrative example, the lamp unit 902 is cordless. In such an example, the lamp unit 902 may include one or more batteries to provide power for illumination. In various examples, the coupling 906 may include one or more power connections 908 configured to transfer power from the mounting base 904 to the lamp unit 902. In such examples, the power connection(s) 908 may charge the one or more batteries of the lamp unit 902.

Figure 10:
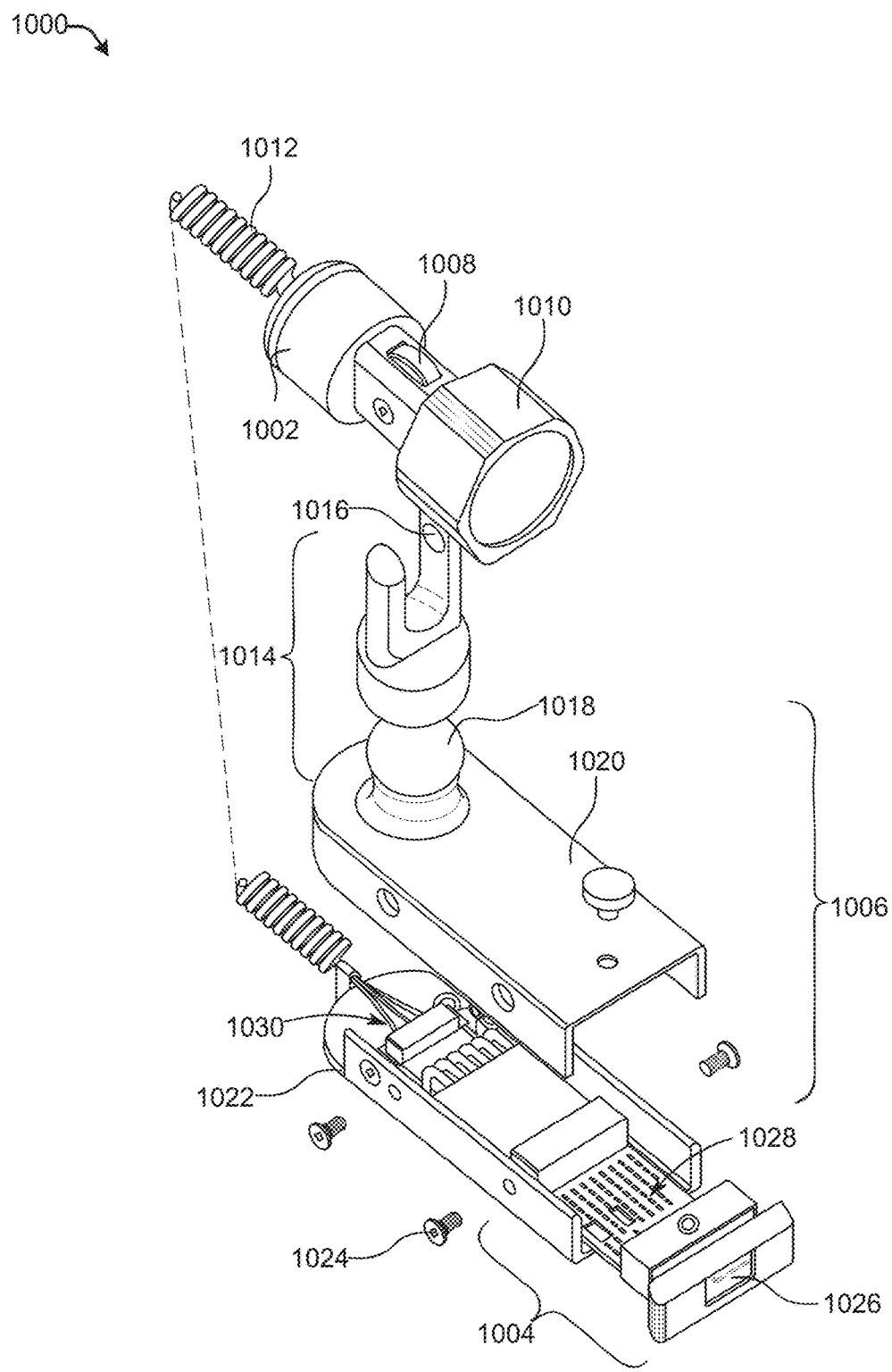
FIG. 10 is an exploded view of components of an example assembly as described with respect to FIGS. 1-9.

FIG. 10 is an exploded view of components of an example assembly 1000, such as lamp assembly 100, 200, 600, 700, 800, and/or 900. Assembly 1000 may include lamp unit 1002, such as lamp unit 102, a computer interface module (CIM) 1004, such as CIM 104, and a mounting base 1006, such as mounting base 106. The lamp unit 1002 may include a parabolic reflector and one or more light sources, such as one or more light emitting diodes (LEDs). In some examples, the one or more light sources may include LEDs of different colors, such as red, clear (e.g., white light), and/or green. In such examples, the lamp unit 1002 may be configured to adjust between different colors of LEDs, such as to provide white light, red light, green light, etc.

In some examples, the lamp unit 1002 may include one or more lenses. In such examples, the lamp unit 1002 may be configured to adjust from one lens to another lens, to adjust a color of the light emitting from the lamp unit 1002. In various examples, the lamp unit 1002 may be configured with an adjustable aperture. In some examples, the lamp unit 1002 may be configured with a dimmer, to increase and/or decrease the intensity of light emitted from the lamp unit 1002. In various examples, one or more features (e.g., bulb, lens, aperture, dimmer, etc.) of a lamp of the lamp unit 1002 may be adjusted via an controller 1008, such as controller 112. In some examples, the one or more features of the lamp may be adjusted via a rheostat knob and/or a collar 1010, such as collar 110.

In various examples, the lamp unit 1002 may be coupled to, and may receive power from the mounting base 1006 via a cord 1012. In other examples, the lamp unit 1002 may be battery powered. In such examples, the lamp unit 1002 may be cordless. In some examples, the lamp unit 1002 may be coupled to the mounting base 1006 via a connector 1014. In some examples, the lamp unit 1002 may be coupled to the connector 1014 via a first coupling 1016. In the illustrative example, the first coupling 1016 includes a snap-fit coupling. In some examples, the first coupling 1016 may permit the lamp to tilt vertically about a horizontal axis, or spin horizontally about a vertical axis.

In some examples, the connector 1014 may be coupled to the mounting base 1006 via a second coupling 1018. In such examples, the second coupling 1018 may permit rotation of the lamp unit 1002 about a vertical axis, or may permit the lamp to tilt vertically about a horizontal axis. In some examples, the connector 1014 may fixed to, as a part of, the mounting base 1006. The connector 1014 may be fixed and/or coupled to a top surface 1020 of the mounting base 1006. In various examples, the top surface 1020 may be secured to a bottom surface 1022 via one or more screw-type connectors 1024. In other examples, the top surface 1020 may be secured to the bottom surface 1022 via snap-fit connectors, magnetic connectors, spring loaded bearings (e.g., spherical, ovular, etc.), or any other type of connection implements.

The mounting base 1006 may be configured to house the CIM 1004. The CIM 1004 may include a receptacle 1026 for receiving a cable. The cable may include a data transfer cable and/or a power adapter. The receptacle 1026 may be configured to receive any one of various types of cable connectors, such as USB, mini USB, micro USB, HDMI, or the like. In some examples, the CIM 1004 may be configured to provide power (e.g., 2.5 W, 5 W, 29 W, 35 W, 65 W, etc.) to a connected electrical device, based at least in part on the type of connector the receptacle is configured to receive.

Additionally, the CIM 1004 may include one or more printed circuit boards 1028 and/or a computing system. In various examples, the printed circuit board(s) 1028 and/or the computing system may be configured to assist in data transfer via a wired connection. In such examples, the data may transfer to and from a connected electronic device via the receptacle 1026 and an attached cable. Additionally or alternatively, the printed circuit board(s) 1028 and/or computing system may be configured to assist in data transfer via a wireless connection. In such examples, the wireless connection may include near field communication (NFC), Bluetooth, Wi-Fi, or other types of wireless connections.

In some examples, the printed circuit board(s) 1028 may comprise part of the computing system of the lamp assembly 1000. In such examples, the computing system may be configured to perform various computing functions, such as calculations, or the like. In some examples, the computing system may be configured to work in conjunction with a connected electronic device to perform desired operations in a cockpit. For example, the connected electronic device may send data to the computing system of the assembly 1000 for complex calculations. For another example, the computing system may receive messages from a remote source, and may push the messages to the connected electronic device.

In various examples, one or more of the printed circuit board(s) 1028 and/or the computing system may be configured to receive and decrypt encrypted wireless messages. In such examples, the one or more of the printed circuit board(s) 1028 and/or the computing system may send the decrypted message to the connected electronic device, such as via a cable connected via the receptacle 1026.

In various examples, the CIM 1004 may be removable and replaceable, in whole or in part. In the illustrative example, the CIM 1004 may be configured to slide out of the mounting base 1006. In some examples, an entire CIM 1004, including the receptacle 1026, the printed circuit boards(s) 1028, and/or the computing system may be removed and replaced. In some examples, one or more of the receptacle 1026, the printed circuit boards(s) 1028, and/or the computing system may be removed from the assembly 1000, and replaced. For example, the CIM 1004 may be removed from the mounting base 1006, and a printed circuit board configured to receive and decrypt encrypted messages may be added to the CIM 1004. The CIM 1004 may be configured to slide back into place in the mounting base 1006.

In various examples, the assembly 1000 may be configured to transfer power from an external power source to the lamp unit 1002 and/or the CIM 1004 (i.e., to provide power to a connected electronic device). In such examples, the assembly 1000 may transfer the power via one or more wires 1030. For example, the one or more wires 1030 may be, or may be configured to connect to existing wiring (e.g., wiring previously used for a different component, such as, for example, an old lamp unit), such as in an airplane cockpit, a motor vehicle, vessel, etc. In such an example, the lamp assembly 1000 may be relatively easy and inexpensive to install.

Figure 11:
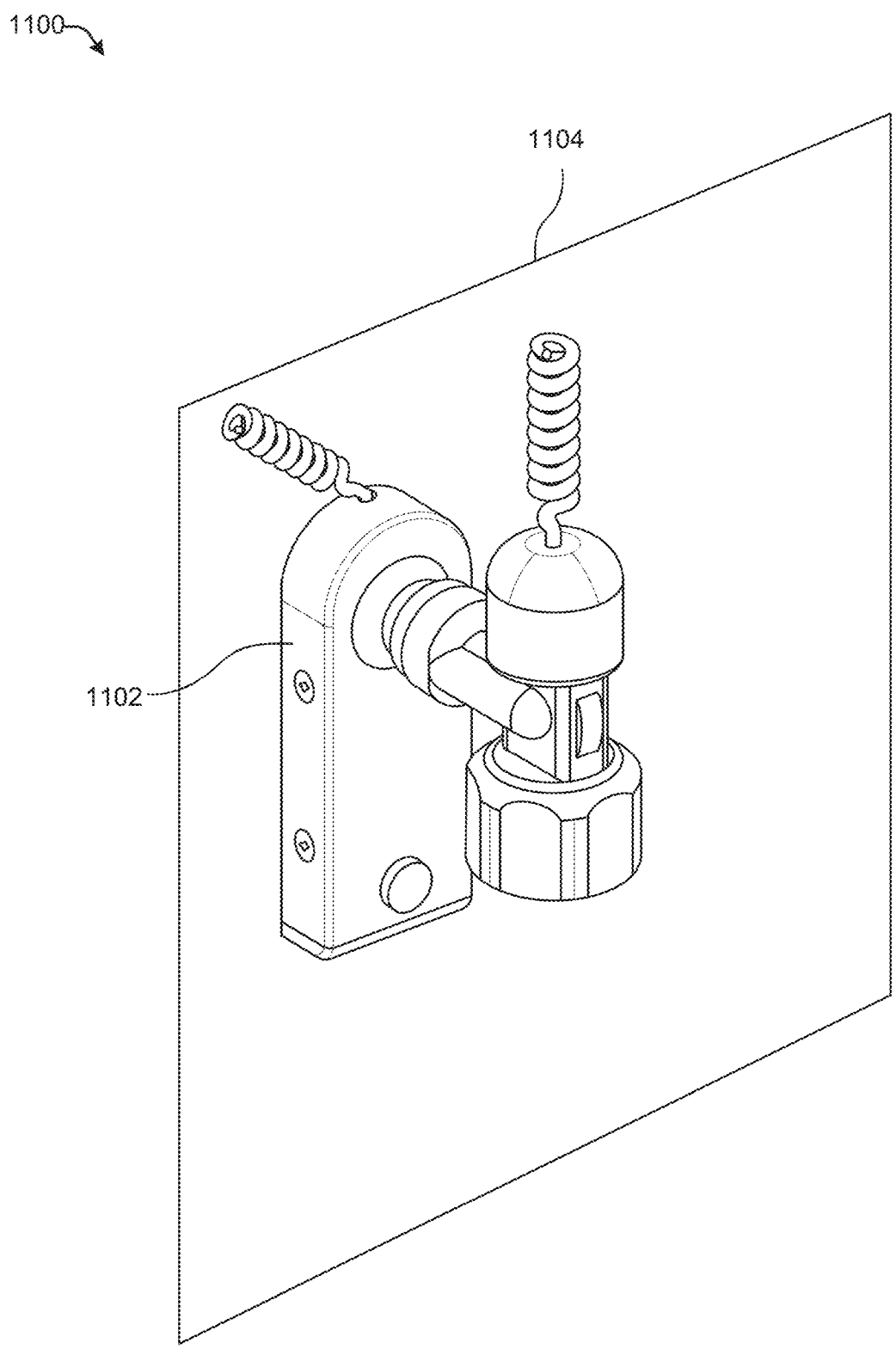
FIG. 11 is a perspective view of an example assembly, as described with respect to FIGS. 1-10, mounted on a vertical surface.

FIG. 11 is a perspective view of an example assembly 1100 mounted on a vertical surface 1104. In various examples, the mounting base 1102, such as mounting base 1006, may be configured to couple to a substantially flat surface, such as the vertical surface 1104. In such examples, the mounting base 1102 may include mounting brackets, to securely couple the assembly 1100, to the vertical surface 1104.

Figure 12:
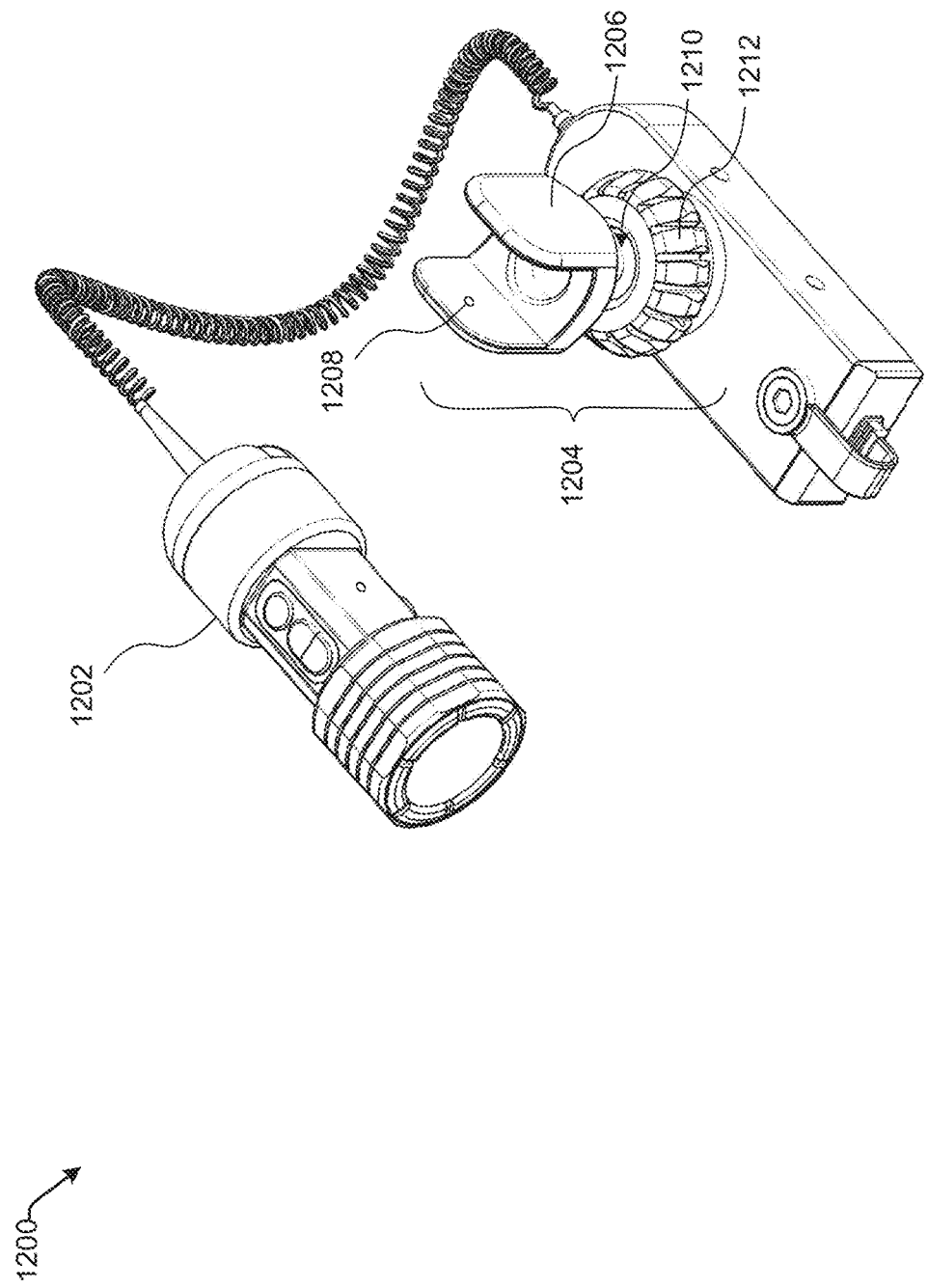
FIG. 12 is a side perspective view of an example assembly with a detachable lamp, coupled to the assembly via an example mechanical coupling.

FIG. 12 is a side perspective view of an example assembly 1200 with a detachable lamp unit 1202, coupled to the assembly 1200 via an example mechanical coupling 1204. As illustrated in FIG. 12, the mechanical coupling 1204 may include a docking mount 1206. The docking mount 1206 may be configured to house the lamp unit 1202. In various examples, the docking mount 1206 may include a coupling 1208 to securely hold the lamp unit 1202 in the docking mount 1206. In the illustrative example, the coupling 1208 includes a snap-fit connector. In other examples, the coupling 1208 may include another type of mechanical coupling, such as hook and loop connector, etc., that is configured to be released by an operator using a single hand.

As illustrated, the mechanical coupling 1204 may include a ball and socket coupling 1210. As described above, the ball and socket coupling 1210 may permit rotation about a vertical axis and tilting about a horizontal axis. In some examples, the mechanical coupling 1204 may additionally include a compression nut 1212. In such examples, the compression nut 1212 may be configured to adjust an amount of force required to move the lamp unit 1202 about the vertical and/or horizontal axis. The compression nut 1212 may be tightened to increase an amount of force required to move the lamp unit 1202, and may be loosened to decrease an amount of force required to move the lamp unit 1202. For example, while operating in a high-G environment at night, such as while flying air-to-air combat maneuvering, an operator of an aircraft may need to occasionally reference information on a kneeboard. The operator may tilt and/or spin the lamp unit 1202 in order to illuminate the kneeboard with the lamp. Once in place, the operator may tighten down the compression nut 1212 to increase the force required to move the lamp unit 1202 in the mechanical coupling 1204. Thus, while the operator increases G-forces exerted on the aircraft, the lamp unit 1202 may remain in place, with the lamp continually illuminating the kneeboard.

Figure 13:
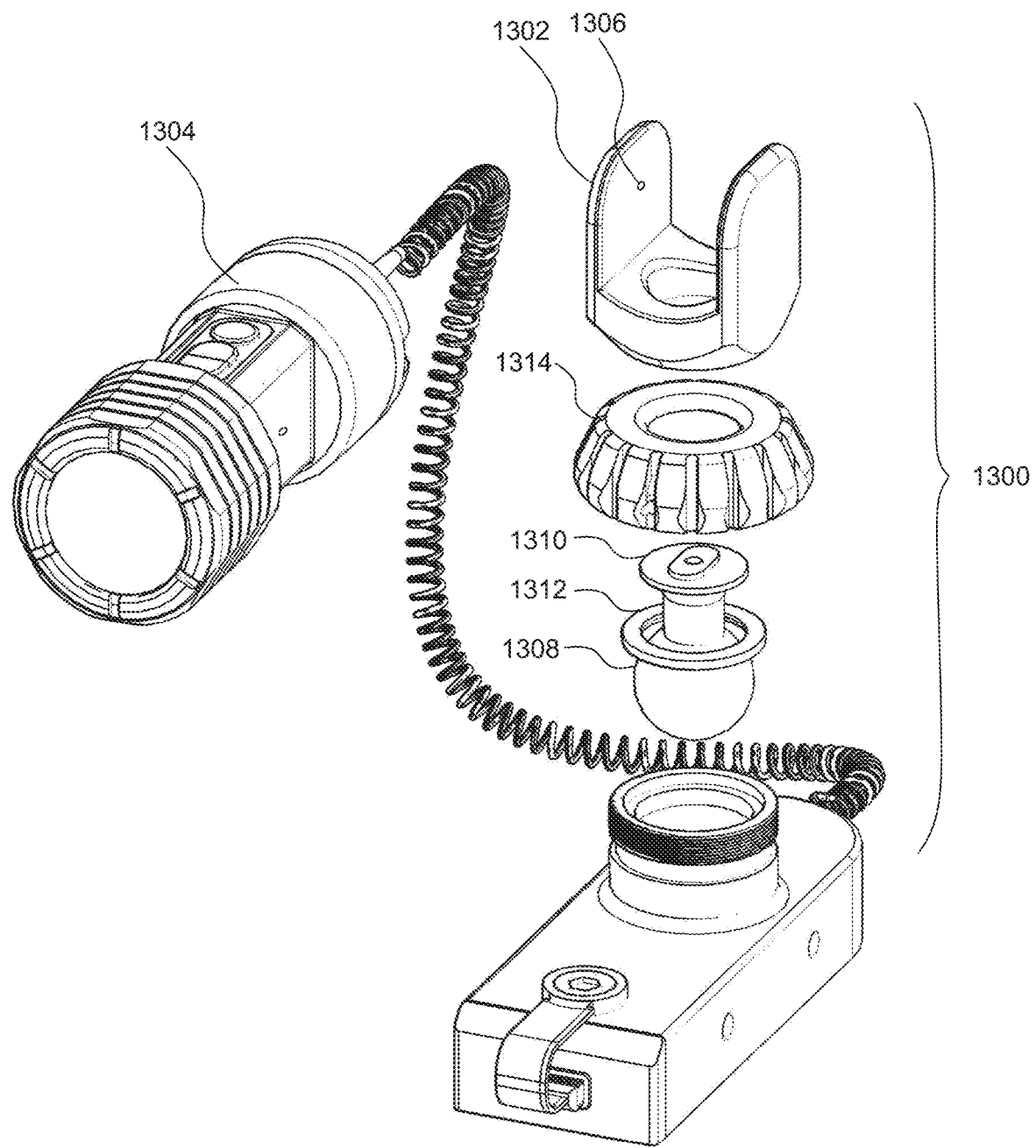
FIG. 13 is an exploded view of components of the example mechanical coupling as described with respect to FIG. 12.

FIG. 13 is an exploded view of components of the example mechanical coupling 1300 as described with respect to FIG. 12. The mechanical coupling 1300 may include a docking mount 1302. The docking mount 1300 may be configured to house the lamp unit 1304. In various examples, the docking mount 1302 may include a coupling 1306 to securely hold the lamp unit 1304 in the docking mount 1302. In the illustrative example, the coupling 1306 includes a snap-fit connector. In other examples, the coupling 1306 may include another type of mechanical coupling, such as hook and loop connector, etc., that is configured to be released by an operator using a single hand.

As illustrated, the mechanical coupling 1300 may include a ball and socket coupling 1308. As described above, the ball and socket coupling 1308 may permit rotation about a vertical axis and tilting about a horizontal axis. The ball and socket coupling 1308 may include a head 1310 and a washer 1312. The head 1310 may be configured to mount through a compression nut 1312 and through an opening on a bottom side of the docking mount 1302. The head 1310 may securely hold the ball and socket coupling 1308, the compression nut 1314, and the docking mount 1302 together. The washer 1312 may assist in securing the ball and socket coupling 1308, the compression nut 1314, and the docking mount 1302 together. Additionally, the washer 1312 may include a frictional component, to increase a coefficient of friction between the ball and socket coupling 1308 and the compression nut 1314. The washer 1312 may include a frictional material, a surface coating with a high coefficient of friction, and/or surface treatment (e.g., pitting, knurling, etc.) to increase a coefficient of friction of the washer 1312. In various examples, the ball and socket coupling 1308 itself may include a frictional material, a surface coating, and/or surface treatment to increase a coefficient of friction of the ball and socket coupling 1308.

In various examples, the compression nut 1314 may be configured to adjust an amount of force required to move the lamp unit 1304 about the vertical and/or horizontal axis. The compression nut 1314 may be tightened to increase an amount of force required to move the lamp unit 1304, and may be loosened to decrease an amount of force required to move the lamp unit 1304.

Figure 14:
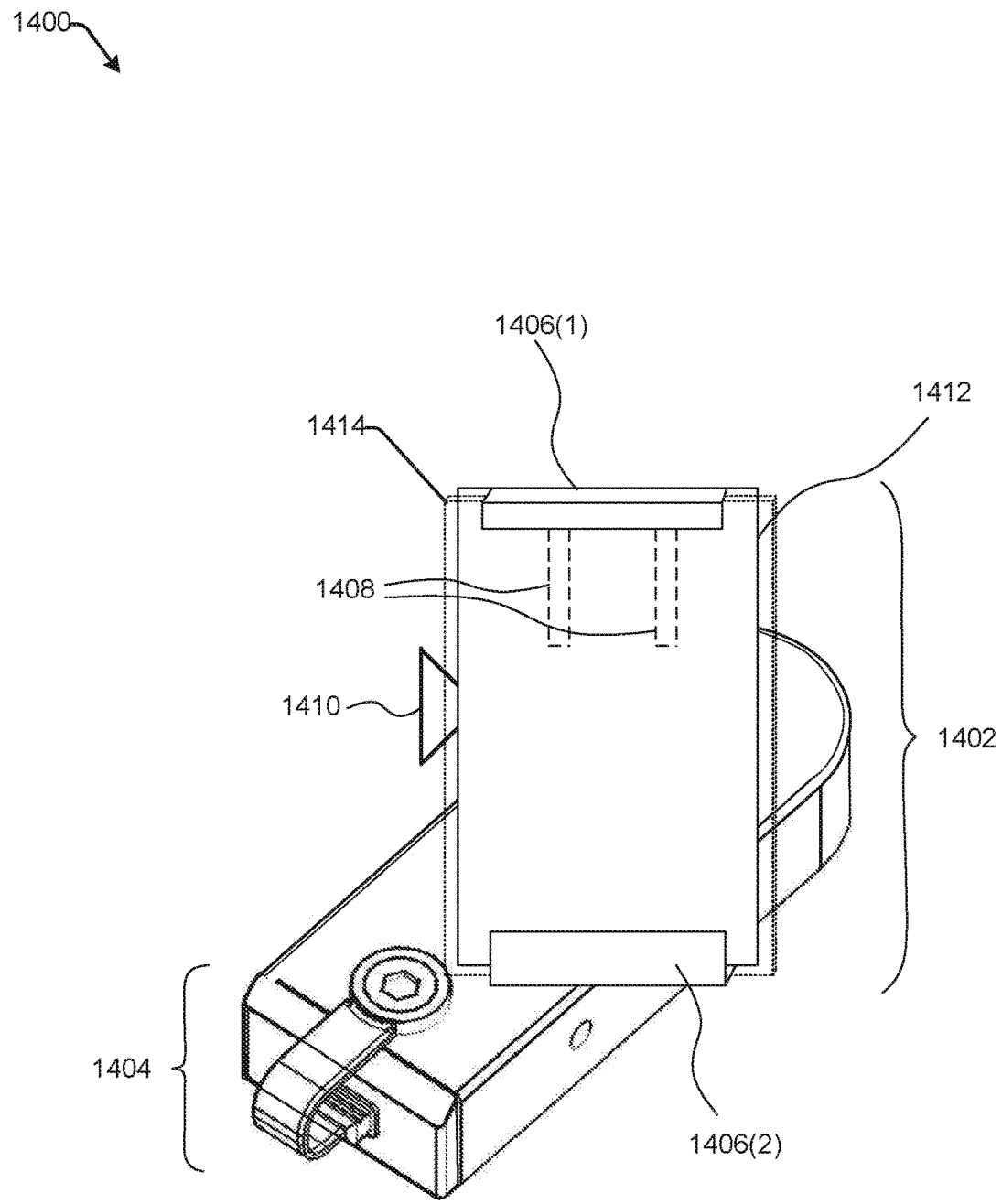
FIG. 14 is a side perspective view of an example assembly with a cradle configured to couple to and house a mobile computing device.

FIG. 14 is a side perspective view of an example assembly 1400 with a cradle 1402 configured to couple to and house a mobile computing device 1414 (e.g., an external computing device 1414). In various examples, the assembly 1400 may include a computer interface module (CIM) 1404, such as CIM 104, 304, etc.

As illustrated in FIG. 14, the cradle 1402 may include one or more arms 1406. In the illustrative example, the cradle 1402 includes two top and bottom grip arms 1406. In such an example, the arms 1406 may couple to and hold a top edge and a bottom edge of a computing device 1414. Additionally or alternatively, the arm(s) may be configured to grip the sides of the computing device 1414. In various examples, the arm(s) 1406 may include a material with a high coefficient of friction, such as certain types of plastic, silicone, etc. In some examples, the arm(s) 1406 may include a surface coating with a material with a high coefficient of friction. In some examples, a surface of the arm(s) 1406 that contacts the computing device 1414 may include a surface texture to increase friction between the arm(s) 1406 and the computing device 1414 coupled thereto.

In various examples, one or more of the arm(s) 1406 may be adjustable, to house mobile computing devices 1414 of different sizes. For example, the arm(s) 1406 may be extended out to house a large tablet, and later retracted in to house a mini-tablet or mobile telephone. In the illustrative example, the arm(s) 1406 may be adjusted along one or more tracks 1408. As illustrated, the top arm 1406(1) may be adjusted vertically along the track(s) 1408, and the bottom arm 1406(2) may be fixed in place. In other examples, both arms 1406(1) and 1406(2) may be adjustable vertically and/or horizontally to house computing devices 1414 of different sizes.

In the illustrative example, the arm(s) 1406 may be secured in place after an adjustment by a securing mechanism 1410. In such an example, the securing mechanism 1410 may be spun in one direction to secure arm(s) 1406 in place, and spun in the other direction to release the arm(s) 1406 for adjustment. Though illustrated as a knob, the securing mechanism may include any type of mechanical securing mechanism, such as, for example, a lever release, a spring release, quick release, or any other type of mechanical mechanism used for securing and releasing an object.

In various examples, the cradle 1402 may include a backplate 1412. The backplate 1412 may provide a surface against which a back side of the mobile computing device 1414 may rest while being housed in the cradle 1402. In some examples, the backplate 1412 may include a plastic, metal, silicone, composite, rubber, or other surface. In some examples, the backplate 1412 may include a friction component, such as a surface coating or plating of a material with a high coefficient of friction. In such examples, the backplate 1412 may assist in securely holding the mobile computing device 1414 in place during vehicle movement. In some examples, the backplate 1412 surface may be treated to increase a coefficient of friction thereof. In such examples, the backplate 1412 may be knurled, pitted, ridged, etc., to increase the coefficient of friction and assist in securely holding the mobile computing device 1414.

Figure 15:
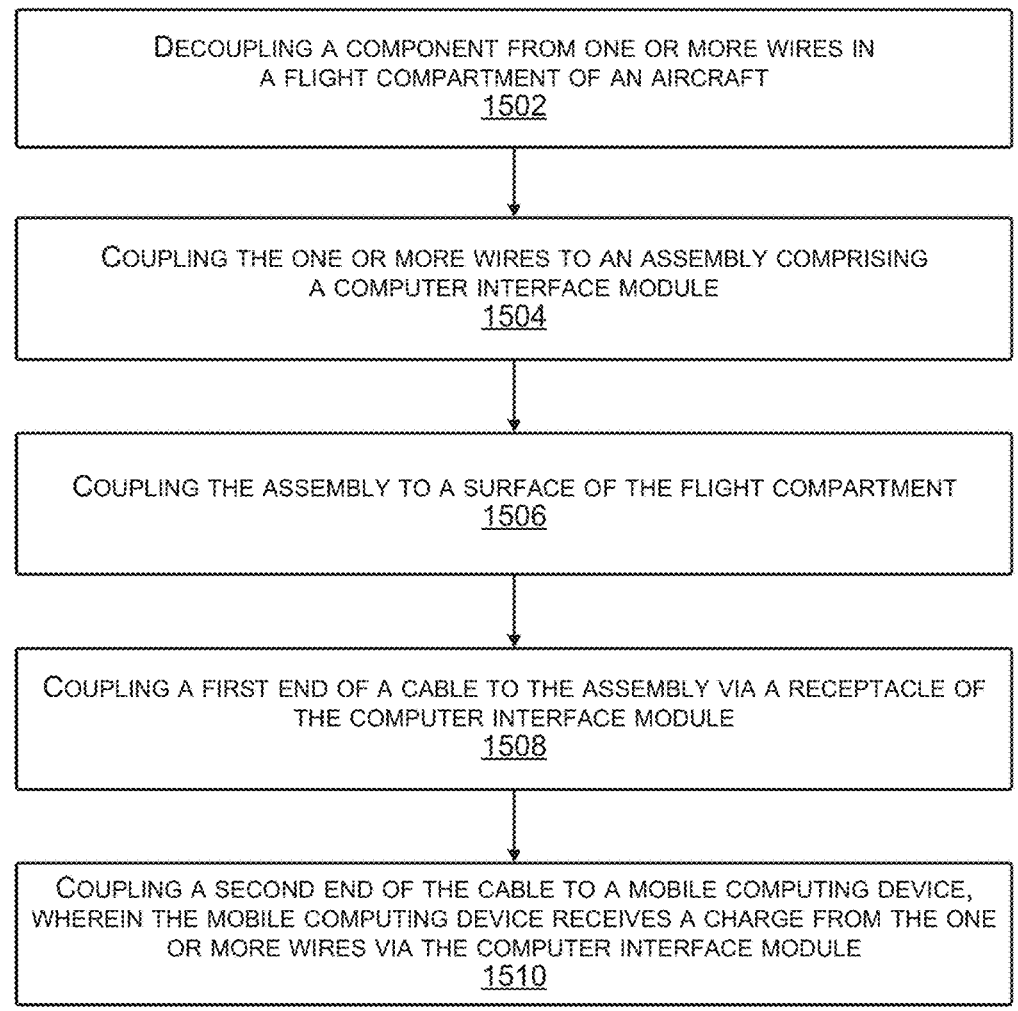
FIG. 15 illustrates a process for installing an assembly as described with respect to FIGS. 1-14 in an aircraft flight compartment.

FIG. 15 is a flow diagram illustrating an example process according to some implementations. The process of FIG. 15 is illustrated as collections of blocks in a logical flow diagrams. The order in which the blocks are described should not be construed as a limitation. Any number of the described blocks can be combined in any order and/or in parallel to implement the process, or alternative processes, and not all of the blocks need be executed.

FIG. 15 is a process for installing an assembly as described with respect to FIGS. 1-14 in an aircraft flight compartment.

Block 1502 illustrates decoupling a component from one or more wires in a flight component of an aircraft, such as wiring 334 (e.g., the first wire 334(1) and the second wire 334(2). In some examples, the wire(s) may be connected to one or more aircraft electrical buses (e.g., aircraft electrical system), and may be charged with AC or DC power. In at least one example, the wire(s) may be charged with 28V AC power. The wire(s) may have previously provided power to the component from the aircraft electrical system. In some examples, a wire of the one or more wires may be configured to transfer data and/or power. In such examples, the wire may additionally be coupled to a computing device of the aircraft.

Block 1504 illustrates coupling the wire(s) to an assembly, such as assembly 100, comprising a computer interface module (CIM), such as CIM 104. The wire(s) may provide power from the aircraft electrical system to the CIM. As described above, in some examples, the wire of the one or more wires configured to transfer data may provide data to and/or receive data from the CIM. In some examples, the CIM may include a printed circuit board and/or a computing device. In various examples, the CIM may be removable from the assembly and replaceable.

In various examples, the assembly may include a lamp unit, such as lamp unit 102, configured to receive power from the wire(s) via the CIM. In some examples, the assembly may include a cradle to house a mobile computing device in the flight compartment of the aircraft.

Block 1506 illustrates coupling the assembly to a surface of the flight compartment. As described above, the assembly may be coupled to the surface via one or more mechanical couplings. In some examples, a mounting plate of the assembly may be mechanically coupled to the surface by a first mechanical coupling, and a mounting base of the assembly may be coupled to the mounting plate via a second mechanical coupling. For example, the mounting plate may be coupled to the surface via screws, and the assembly may be coupled to the mounting plate via spring release fasteners.

Block 1508 illustrates coupling a first end of a cable to the assembly via a receptacle of the CIM, such as receptacle 122. The cable may include a charging cable and/or a data transfer cable. In various examples, the cable may be configured to provide power from the wire(s) via the CIM to a mobile computing device.

Block 1510 illustrates coupling a second end of the cable to a mobile computing device, wherein the mobile computing device receives a charge from the wire(s) via the CIM. In some examples, the mobile computing device may be configured to transmit and/or receive data from the CIM and/or the computing device of the aircraft via the cable. In some examples, the mobile computing device may be configured to transmit data via a wireless connection, such as WiFi, Bluetooth, or other wireless connection. In various examples, the wireless connection may be secure between the mobile computing device and the CIM and/or the computing device of the aircraft. In such examples, the wireless connection may be password protected and/or the data transmitted between the devices may be encrypted.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
  a mounting base mechanically coupled to an interior surface of a vehicle subject to a regulatory authority and permanently coupled to a wire of the, wherein the wire of the vehicle was installed to provide power to the device or was previously coupled to and provided power to a component of the vehicle that has subsequently been removed from the vehicle;
  a lamp unit detachably coupled to the mounting base, wherein the lamp unit comprises a lamp configured to adjust an emitted light from a first color to a second color; and
  a computer interface module detachably coupled to the mounting base and configured to couple to an external computing device, wherein the computer interface module is configured to receive the power from a first wire or a second wire of the vehicle and transfer the power to the external computing device.

2. The device of claim 1, wherein the first color and the second color comprise at least one of:
  white;
  red;
  green; or
  blue.

3. The device of claim 1, wherein the lamp comprises a light emitting diode array, with a first light emitting diode of the first color and a second light emitting diode of the second color.

4. The device of claim 1, wherein the first wire or the second wire provides AC or DC electrical power to the computer interface module via the mounting base.

5. The device of claim 1, further comprising a cradle for housing the external computing device, wherein the cradle comprises:
  a back plate; and
  one or more adjustable arms for securing the external computing device in place.

6. The device of claim 1, wherein the lamp unit is detachably coupled to the mounting base via at least one of:
  a magnetic coupling;
  a snap fit connector; or
  a hook and loop connector.

7. The device of claim 1, wherein the computer interface module is configured to couple to the external computing device via a receptacle of the computer interface module, the receptacle comprising a port configured to receive a charging cable coupled to the external computing device.

8. The device of claim 1, wherein the mounting base is coupled to the first wire and the second wire of the vehicle, the second wire being coupled to a computing device of the vehicle, and being configured to transfer data between the computing device of the vehicle and at least one of:
  the computer interface module; or
  the external computing device.

9. A device comprising:
  a mounting base mechanically coupled to an interior surface of a vehicle subject to a regulatory authority and coupled to a wire of the vehicle, wherein a coupling between the mounting base and the wire comprises a direct hardwire connection to the vehicle and wherein the wire of the vehicle was installed to provide power to the device or was previously provided power to a component of the vehicle;
  a computer interface module detachably coupled to the mounting base and configured to couple to an external computing device, wherein the computer interface module is configured to receive power from the wire of the vehicle and transfer the power to the external computing device; and
  a cradle configured to house the external computing device.

10. The device of claim 9, further comprising a lamp unit detachably coupled to the mounting base.

11. The device of claim 10, wherein the lamp unit comprises a light emitting diode array with a first light emitting diode of a first color and a second light emitting diode of a second color.

12. The device of claim 10, wherein the lamp unit comprises a lamp configured to adjust from emitting a white light to emitting at least one of:
 a red light;
 a green light; or
 a blue light.

13. The device of claim 10, wherein the lamp unit is detachably coupled to the mounting base via at least one of:
 a snap-fit connector;
 a magnetic connector; or
 a hook and loop connector.

14. The device of claim 9, wherein the cradle comprises a backplate and one or more adjustable arms.

15. The device of claim 9, wherein the computer interface module is configured to couple to the external computing device via a receptacle of the computer interface module, the receptacle comprising at least one of:
 a universal serial board connector;
 a mini universal serial board connector;
 a micro universal serial board connector; or
 a high-definition multimedia interface connector.

16. The device of claim 9, wherein the wire is a first wire and the mounting base is further coupled to a second wire of the vehicle, the second wire being coupled to a computing device of the vehicle, and being configured to transfer data between the computing device of the vehicle and at least one of:
 the computer interface module; or
 the external computing device.

17. The device of claim 1, wherein the vehicle subject to the regulatory authority comprises at least one of:
 a military vehicle;
 a military vessel;
 a commercial vehicle; or
 a commercial vessel.

18. The device of claim 9, wherein the vehicle subject to the regulatory authority comprises at least one of:
 a military vehicle;
 a military vessel;
 a commercial vehicle; or
 a commercial vessel.

19. A system comprising:
 a mounting base mechanically coupled to a surface of a vehicle subject to a regulatory authority and permanently coupled to a wire of the vehicle, wherein the wire of the vehicle was installed to provide power to at least the mounting base or was previously coupled to and provided power to a component of the vehicle that has subsequently been removed from the vehicle;
 at least one of:
  a lamp unit detachably coupled to the mounting base, wherein the lamp unit comprises a lamp configured to adjust an emitted light from a first color to a second color; or
  a cradle configured to house an external computing device; and
 a computer interface module detachably coupled to the mounting base and configured to couple to the external computing device, wherein the computer interface module is configured to receive the power from the wire of the vehicle and transfer the power to the external computing device.

20. The system of claim 19, wherein the computer interface module is configured to couple to the external computing device via a receptacle of the computer interface module, the receptacle comprising a port configured to receive a charging cable coupled to the external computing device.

* * * * *